(12) United States Patent
Kai

(10) Patent No.: US 10,652,123 B2
(45) Date of Patent: May 12, 2020

(54) THROUGHPUT MEASURING APPARATUS, METHOD, AND RECORDING MEDIUM

(71) Applicant: NEC Corporation, Minato-ku, Tokyo (JP)

(72) Inventor: Natsuki Kai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 46 days.

(21) Appl. No.: 15/768,067

(22) PCT Filed: Nov. 1, 2016

(86) PCT No.: PCT/JP2016/004780
§ 371 (c)(1),
(2) Date: Apr. 13, 2018

(87) PCT Pub. No.: WO2017/077704
PCT Pub. Date: May 11, 2017

(65) Prior Publication Data
US 2018/0324073 A1    Nov. 8, 2018

(30) Foreign Application Priority Data

Nov. 6, 2015  (JP) .................................. 2015-218369

(51) Int. Cl.
*H04L 12/26* (2006.01)

(52) U.S. Cl.
CPC ...... *H04L 43/0888* (2013.01); *H04L 43/0841* (2013.01); *H04L 43/0864* (2013.01)

(58) Field of Classification Search
None
See application file for complete search history.

(56) References Cited

U.S. PATENT DOCUMENTS

2005/0289395 A1    12/2005    Katsuyama et al.
2009/0116402 A1*   5/2009     Yamasaki ................ H04L 1/20
                                                              370/253
(Continued)

FOREIGN PATENT DOCUMENTS

JP    2004-140596 A    5/2004
JP    2005-244851 A    9/2005
(Continued)

OTHER PUBLICATIONS

International Search Report for PCT Application No. PCT/JP2016/004780, dated Jan. 24, 2017.
(Continued)

*Primary Examiner* — Saba Tsegaye

(57) ABSTRACT

In order to enable to measure a throughput with high accuracy in an application layer, a throughput measuring method according to an exemplary aspect of the invention includes: transmitting data to a receiving device, receiving a feedback indicating a receiving completion of the data, from the receiving device, calculating a boundary value of a range of values allowable for a throughput, based on the feedback and a transmitted data amount of the data, measuring a theoretical value of the throughput, and outputting the boundary value when the theoretical value falls outside the range, and outputting the theoretical value when the theoretical value falls within the range.

20 Claims, 16 Drawing Sheets

(56) References Cited

U.S. PATENT DOCUMENTS

2014/0169164 A1* 6/2014 Oguchi ............... H04L 47/193
370/230
2016/0191585 A1* 6/2016 Ramamurthi .......... H04L 65/80
709/231
2016/0323421 A1* 11/2016 Sakurai ............... H04L 69/163

FOREIGN PATENT DOCUMENTS

| JP | 2006-013920 A | 1/2006 |
|----|---------------|---------|
| JP | 2009-296304 A | 12/2009 |

OTHER PUBLICATIONS

English translation of Written opinion for PCT Application No. PCT/JP2016/004780.

* cited by examiner

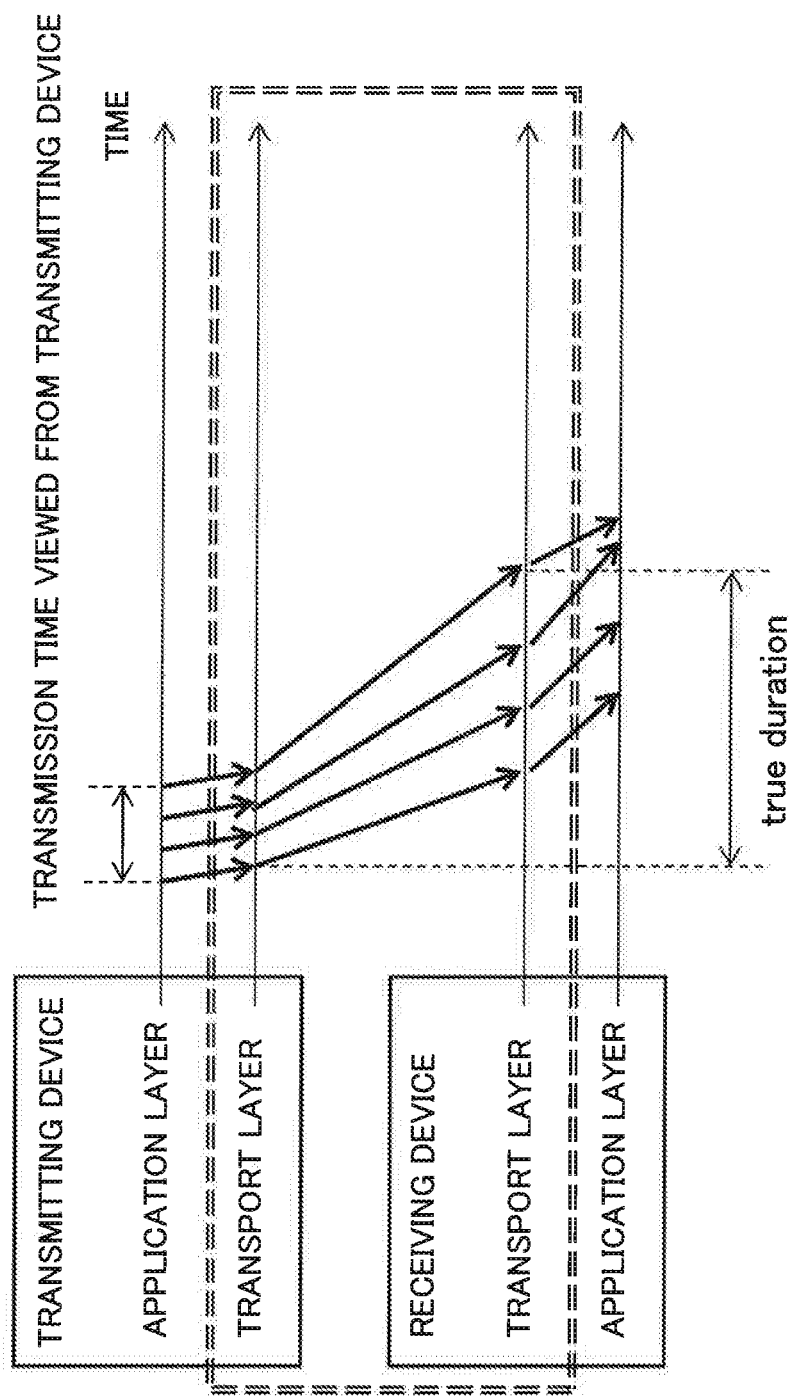

THROUGHPUT MEASURING APPARATUS, METHOD, AND RECORDING MEDIUM

This application is a National Stage Entry of PCT/JP2016/004780 filed on Nov. 1, 2016, which claims priority from Japanese Patent Application 2015-218369 filed on Nov. 6, 2015, the contents of all of which are incorporated herein by reference, in their entirety.

TECHNICAL FIELD

The present invention relates to a throughput measuring apparatus, a method, and a recording medium for measuring a throughput in an application layer.

BACKGROUND ART

A throughput between a transmitting device and a receiving device is defined as a value acquired by dividing a data amount of measurement data transmitted from the transmitting device to the receiving device by a transmission time required for transmitting the measurement data. The transmission time is a transmission time (corresponding to a true duration in FIG. 16) between transport layers of the transmitting device and the receiving device.

FIG. 16 is a diagram illustrating a lapse of time of measurement data transmitted from an application of a transmitting device to an application of a receiving device. A bold arrow indicates a flow of transmission of measurement data output from an application layer. The measurement data output from the application of the transmitting device are transmitted from a transport layer of the transmitting device to a transport layer of the receiving device, and are transferred to the application of the receiving device. A transmission time between the transport layers is a time required after a first packet of measurement data is transmitted from the transport layer until a last packet is received by the transport layer of the receiving device.

On the other hand, among applications, there is an application of a type which changes a service to be provided, depending on a measured throughput. For example, in an adaptive video streaming application, an image quality of video to be streamed is changed depending on a measured throughput. However, when a throughput is measured in an application layer, it is not possible to know a transmission time (true duration) between transport layers.

In view of the above, there is a method for calculating a throughput by using a transmission time viewed from an application layer of a transmitting device. In this method, a time after an application layer of a transmitting device starts transmitting measurement data until the transmission is completed is used as a transmission time. However, since the transmission time to be used by this method is different from a true duration, the difference may cause an error in a measurement result of a throughput.

Further, in this method, a data amount of measurement data is required to be sufficiently large, as compared with a size of a transmission buffer of a transport layer of a transmitting device. This is because, when measurement data are smaller than a size of a transmission buffer, transmission seems to be instantaneously completed when viewed from an application layer, since it is possible to instantaneously transfer measurement data from the application layer to the transmission buffer of the transport layer. Consequently, since a transmission time viewed from the application layer becomes substantially zero, a measurement error of a throughput may increase.

On the contrary, in a method described in PTL 1, a throughput is theoretically calculated based on a re-transmission occurrence rate, an average packet round-trip delay time, a packet loss rate, and the like. In this method, it is possible to measure a throughput without depending on a size of measurement data.

CITATION LIST

Patent Literature

[PTL 1] Japanese Laid-open Patent Publication No. 2004-140596

SUMMARY OF INVENTION

Technical Problem

However, in the method of PTL 1, an error with respect to an actual throughput may increase in an environment where a spike delay or a burst loss is likely to occur, for example, a network where fluctuation is large such as a mobile network. For example, when an actual throughput is lowered, and a round-trip delay time increases regardless that packet loss hardly occurs, a theoretical value may become larger than an actual throughput since a packet loss rate in a denominator of a calculation formula of the theoretical value is approximate to zero.

An object of the present invention is to provide a throughput measuring apparatus, a method, and a recording medium, which enable to measure a throughput with high accuracy in an application layer.

Solution to Problem

For settling the above-mentioned problem, a throughput measuring apparatus according to an exemplary aspect of the invention comprises: a data transmitting means for transmitting data to a receiving device, a feedback receiving means for receiving feedback indicating a receiving completion of the data, from the receiving device, a boundary value calculating means for calculating a boundary value of a range of values allowable for a throughput, based on the feedback and a transmitted data amount of the data, a theoretical value measuring means for measuring a theoretical value of the throughput, and an output means for outputting the boundary value when the theoretical value falls outside the range, and outputting the theoretical value when the theoretical value falls within the range.

And, a throughput measuring method according to an exemplary aspect of the invention comprises: transmitting data to a receiving device, receiving feedback indicating a receiving completion of the data, from the receiving device, calculating a boundary value of a range of values allowable for a throughput, based on the feedback and a transmitted data amount of the data, measuring a theoretical value of the throughput, and outputting the boundary value when the theoretical value falls outside the range, and outputting the theoretical value when the theoretical value falls within the range.

And, a computer readable recording medium according to an exemplary aspect of the invention is recorded with a throughput measuring program causing a computer to execute: a data transmitting function of transmitting data to a receiving device, a feedback receiving function of receiving feedback indicating a receiving completion of the data, from the receiving device, a boundary value calculating function of calculating a boundary value of a range of values allowable for a throughput, based on the feedback and a transmitted data amount of the data, a theoretical value measuring function of measuring a theoretical value of the throughput, and an output function of outputting the boundary value when the theoretical value falls outside the range, and outputting the theoretical value when the theoretical value falls within the range.

Advantageous Effects of Invention

By the throughput measuring apparatus, the method, and the recording medium according to the present invention, it becomes possible to measure a throughput with high accuracy in an application layer.

BRIEF DESCRIPTION OF DRAWINGS

FIG. 16 shows a diagram illustrating a relationship between a transmission time viewed from a transmitting device, and a true duration.

DESCRIPTION OF EMBODIMENTS

First Example Embodiment

A first example embodiment of the present invention is described.

Figure 1:
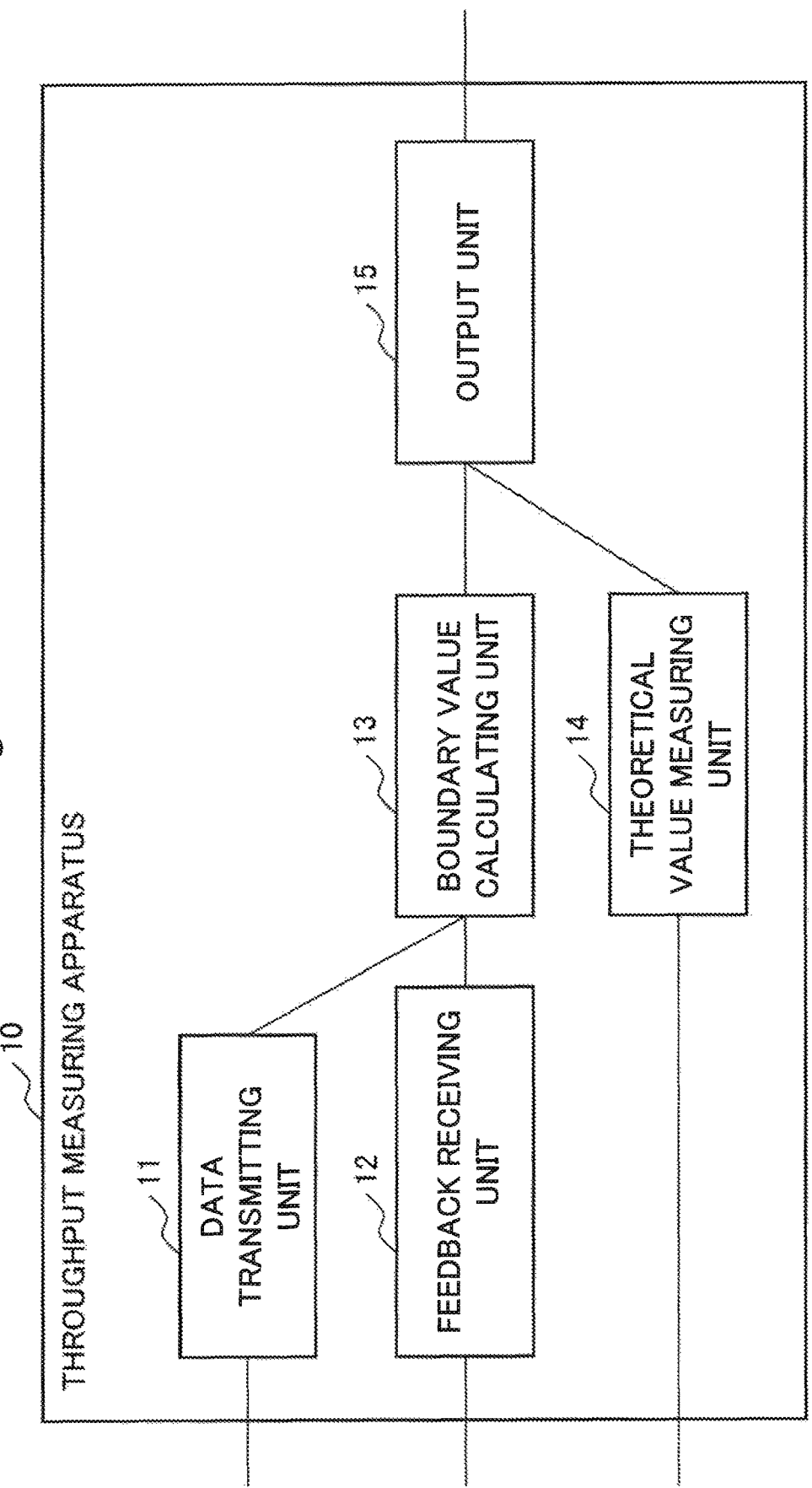
FIG. 1 shows a diagram illustrating a configuration example of a throughput measuring apparatus in first to fourth example embodiments of the present invention.

FIG. 1 illustrates a configuration example of a throughput measuring apparatus 10 in the present example embodiment.

The throughput measuring apparatus 10 in the present example embodiment includes a data transmitting unit 11, a feedback receiving unit 12, a boundary value calculating unit 13, a theoretical value measuring unit 14, and an output unit 15.

The data transmitting unit 11 is a portion for transmitting data to a receiving device. The feedback receiving unit 12 is a portion for receiving feedback indicating that data reception is completed from the receiving device. The boundary value calculating unit 13 is a portion for calculating a boundary value of a range of values allowable for a throughput, based on feedback and a transmitted data amount of data. The theoretical value measuring unit 14 is a portion for measuring a theoretical value of a throughput. The output unit 15 is a portion for outputting a boundary value when a theoretical value falls outside the range of values allowable for a throughput, and outputting a theoretical value when the theoretical value falls within the range.

By configuring the throughput measuring apparatus 10 as described above, it becomes possible to output a boundary value closer to a true throughput as a throughput, when a theoretical value falls outside a range of values allowable for the throughput. Therefore, it becomes possible to measure a throughput with high accuracy in an application layer.

Figure 2:
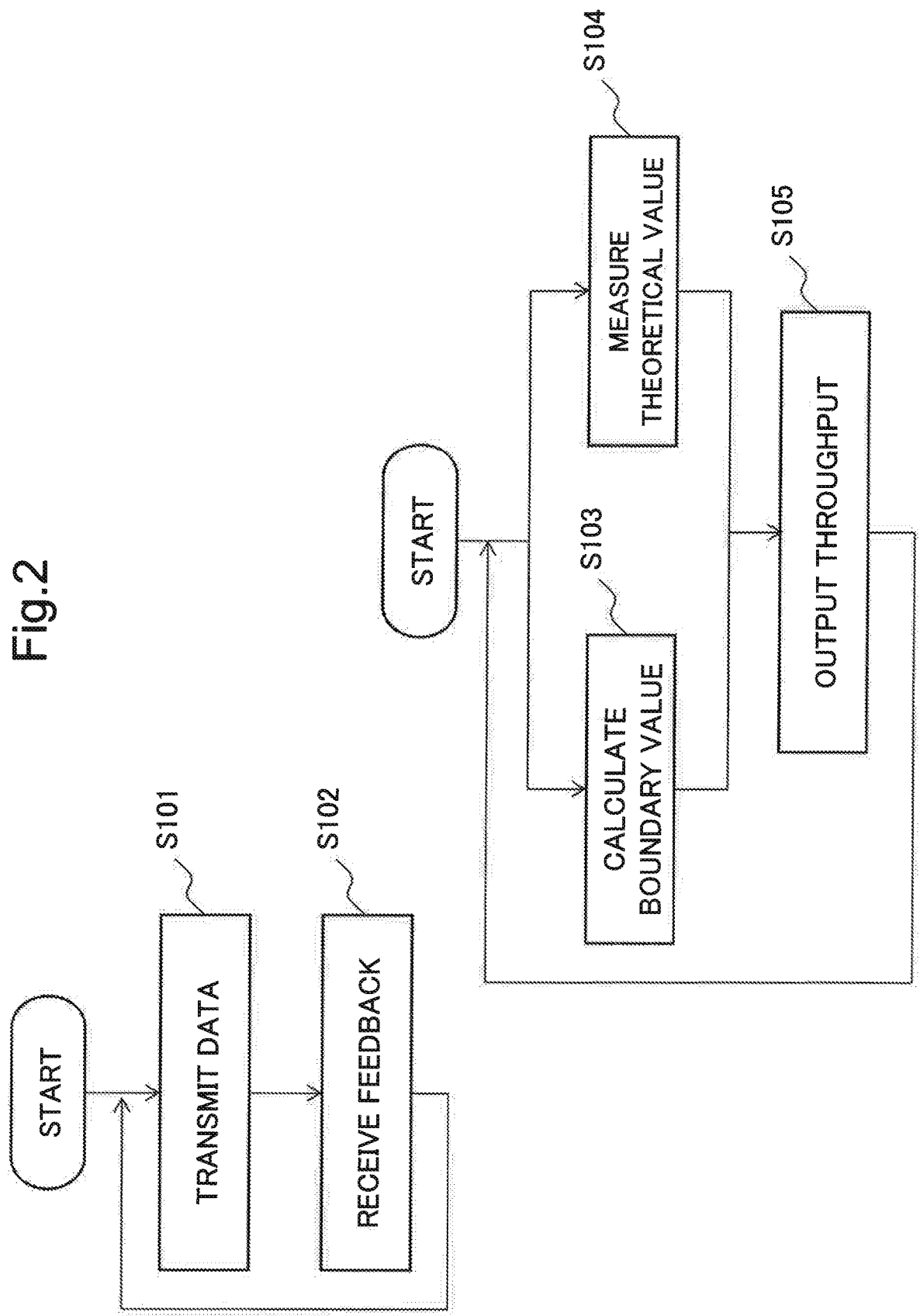
FIG. 2 shows a diagram illustrating an operation example of the throughput measuring apparatus in the first example embodiment of the present invention.

Next, FIG. 2 illustrates an example of an operation of the throughput measuring apparatus 10 in the present example embodiment.

First of all, the data transmitting unit 11 of the throughput measuring apparatus 10 transmits data to a receiving device (Step S101). Then, the feedback receiving unit 12 receives feedback indicating that data reception is completed from the receiving device (Step S102).

The boundary value calculating unit 13 calculates a boundary value of a range of values allowable for a throughput, based on feedback and a transmitted data amount of data (Step S103). Further, the theoretical value measuring unit 14 measures a theoretical value of a throughput (Step S104).

Then, the output unit 15 outputs a boundary value when a theoretical value falls outside the range of values allowable for a throughput, and outputs a theoretical value when the theoretical value falls within the range (Step S105).

By operating the throughput measuring apparatus 10 as described above, it becomes possible to measure a throughput with high accuracy in an application layer.

As described above, in the first example embodiment of the present invention, feedback indicating that data reception is completed is received from the receiving device, and a boundary value of a throughput is calculated based on the feedback. Then, when a theoretical value falls outside the range, a boundary value is output. Therefore, it becomes possible to output a boundary value closer to a true output as a throughput, when a theoretical value is greatly deviated from the true throughput by external disturbance. Therefore, it becomes possible to measure a throughput with high accuracy in an application layer.

Second Example Embodiment

Next, a second example embodiment of the present invention is described.

In the present example embodiment, a case where a boundary value is an upper limit in a throughput measuring apparatus 10 is specifically described.

Figure 3:
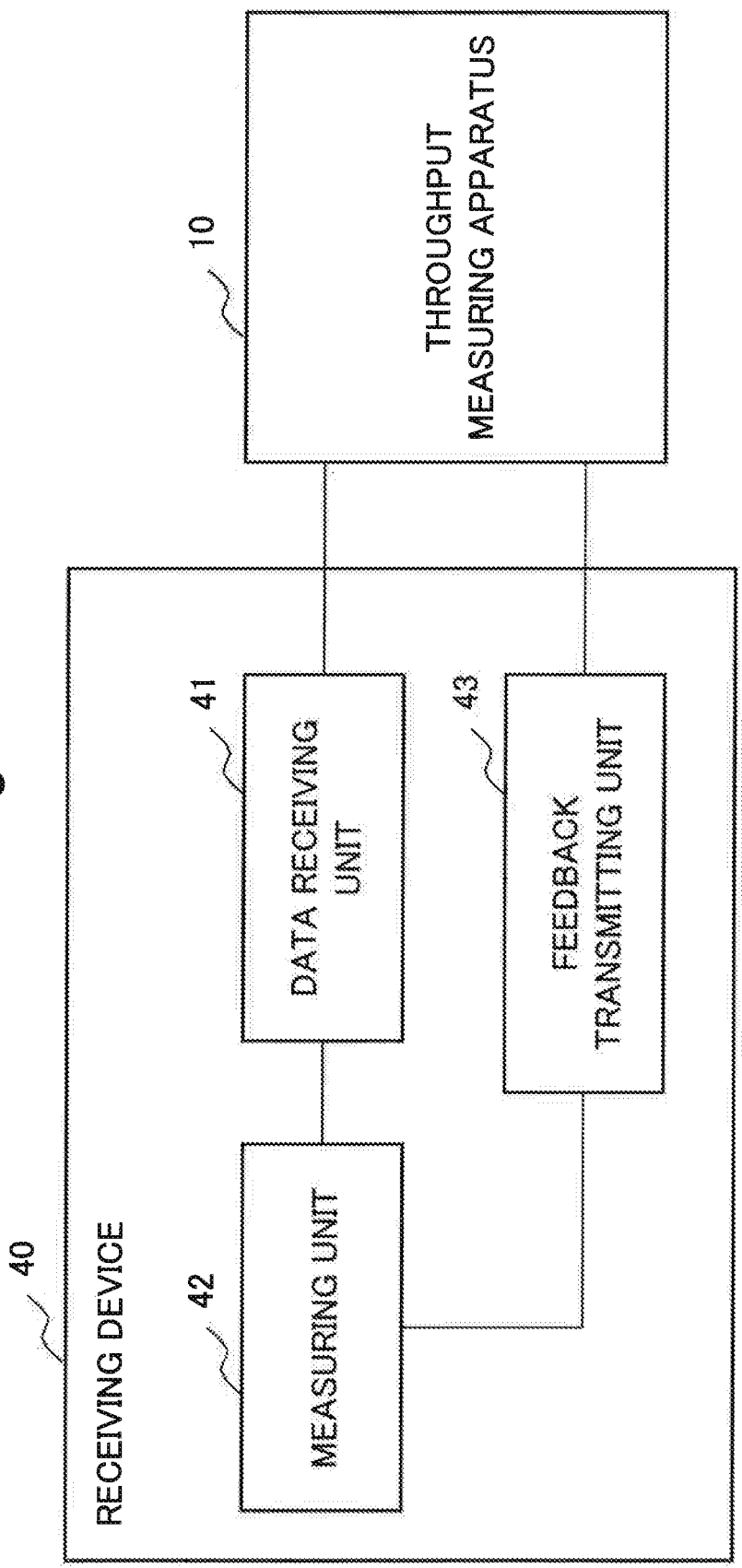
FIG. 3 shows a diagram illustrating a configuration example of a receiving device in the second to fourth example embodiments of the present invention.

First of all, the throughput measuring apparatus 10 and a receiving device 40 in the present example embodiment are described using FIG. 1 and FIG. 3.

A configuration example of the throughput measuring apparatus 10 is similar to that of the first example embodiment. As illustrated in FIG. 3, the throughput measuring apparatus 10 transmits and receives data to and from the receiving device 40 via a network.

A data transmitting unit 11 of the throughput measuring apparatus 10 is a portion for transmitting data to the receiving device 40. In the present example embodiment, data are intermittently transmitted to the receiving device 40 by a transmission control protocol (TCP). It is assumed that data to be transmitted herein are data in an application which changes a behavior by a throughput, for example, an application such as adaptive video streaming which changes an image quality by a throughput.

A feedback receiving unit 12 is a portion for receiving feedback indicating that data reception is completed from the receiving device 40. In the present example embodiment, a receiving start time and a receiving completion time of data are received as feedback. Note that a lapse of receiving time from a receiving start time until a receiving completion time of data may be received as feedback.

A boundary value calculating unit 13 is a portion for calculating an upper limit of a throughput, based on feedback and an amount of transmitted data. Note that an amount of data received by a receiving device may be received as feedback, and an upper limit may be calculated by using an amount of received data, in place of an amount of transmitted data.

A theoretical value measuring unit 14 is a portion for measuring a theoretical value of a throughput. An output unit 15 is a portion for outputting an upper limit when a theoretical value is larger than the upper limit, and outputting a theoretical value when the theoretical value is equal to or smaller than an upper limit.

The receiving device 40 includes a data receiving unit 41, a measuring unit 42, and a feedback transmitting unit 43.

The data receiving unit 41 of the receiving device 40 is a portion for receiving data transmitted by the data transmitting unit 11 of the throughput measuring apparatus 10. Data to be received by the data receiving unit 41 are fragmented into a size of a receiving buffer, and then received.

The measuring unit 42 is a portion for measuring a receiving start time and a receiving completion time of data. The receiving start time is a time when receiving a first piece of fragmented data by the data receiving unit 41 is started. Further, the receiving completion time is a time when receiving a last piece of fragmented data by the data receiving unit 41 is started (or completed).

The feedback transmitting unit 43 is a portion for transmitting feedback to the feedback receiving unit 12 of the throughput measuring apparatus 10. In the present example embodiment, a receiving start time and a receiving completion time of data are transmitted as feedback. Note that a lapse of receiving time from a receiving start time until a receiving completion time of data may be transmitted as feedback.

Figure 4:
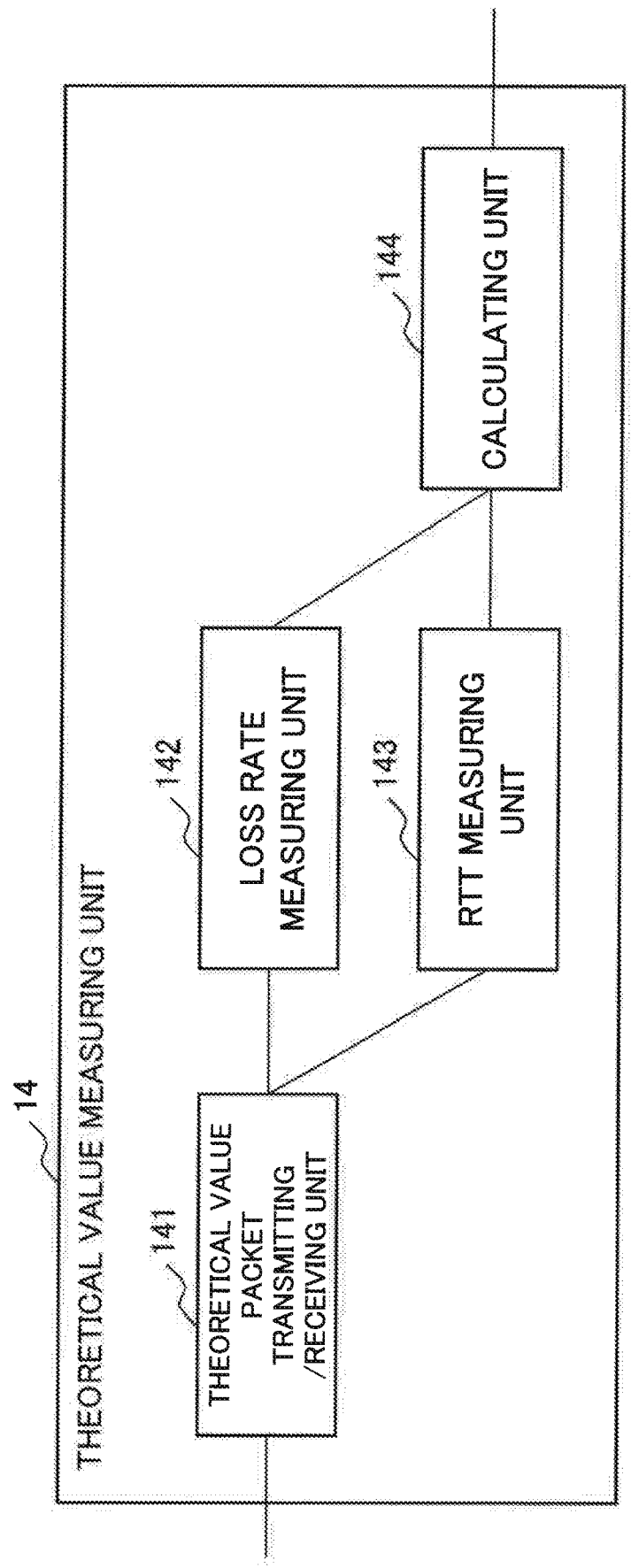
FIG. 4 shows a diagram illustrating a configuration example of a theoretical value measuring unit in the second to fourth example embodiments of the present invention.
Figure 5:
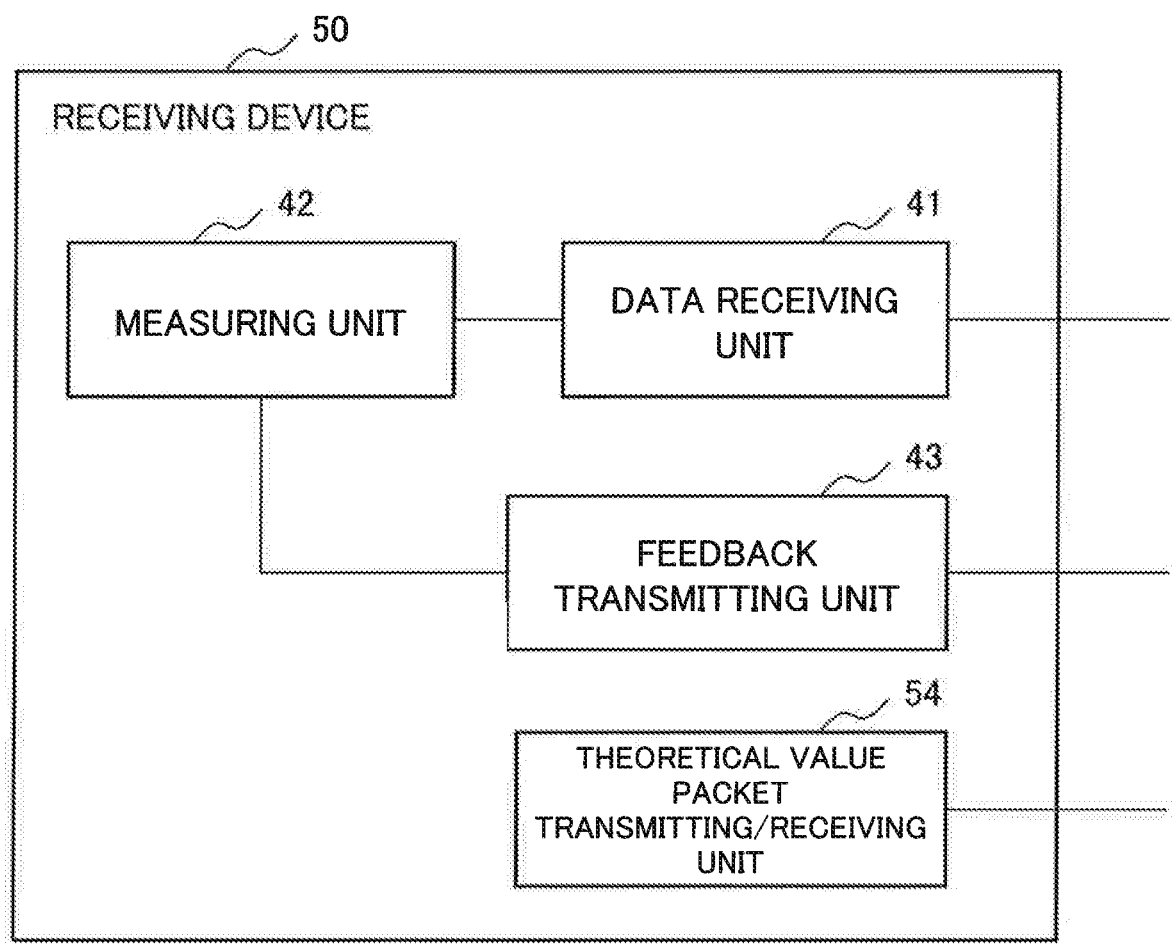
FIG. 5 shows a diagram illustrating a configuration example of the receiving device in the second to fourth example embodiments of the present invention.

Next, a configuration example of the theoretical value measuring unit 14 of the throughput measuring apparatus 10 is described using FIG. 4 and FIG. 5.

As a method for measuring a theoretical value of a throughput in the present example embodiment, an arbitrary method may be used. In view of the above, although a configuration of the theoretical value measuring unit 14 is not limited to a configuration example in FIG. 4, in the present example embodiment, as a specific example, a method for measuring a theoretical value from a round-trip time (hereinafter, RTT) and a packet loss rate is described.

FIG. 4 is a configuration example of the theoretical value measuring unit 14 of the throughput measuring apparatus 10. Further, FIG. 5 is a configuration example of a receiving device 50 when the theoretical value measuring unit 14 is configured as a configuration example in FIG. 4. Hereinafter, the present example embodiment is described by using the receiving device 50 in place of the receiving device 40.

The theoretical value measuring unit 14 includes a theoretical value packet transmitting/receiving unit 141, a loss rate measuring unit 142, an RTT measuring unit 143, and a calculating unit 144, for example.

The theoretical value packet transmitting/receiving unit 141 of the theoretical value measuring unit 14 is a portion for transmitting and receiving a packet for theoretical value measurement to and from a theoretical value packet transmitting/receiving unit 54 of the receiving device 50. In the present example embodiment, by transmitting and receiving a user datagram protocol (UDP) packet for theoretical value measurement, a packet loss rate and an RTT necessary for theoretical value measurement are acquired. Note that it is also possible to transmit a packet for theoretical value measurement by a protocol other than a UDP.

Note that, in a case of video streaming exemplified in the present example embodiment, a TCP transmission rate is generally several hundred kbps or more. On the other hand, it is possible to implement a UDP packet transmission rate for theoretical value measurement at 1 kbps or less. Therefore, an influence of transmitting and receiving a packet for theoretical value measurement on calculation of an upper limit and a lower limit becomes a sufficiently negligible level.

The loss rate measuring unit 142 is a portion for measuring a packet loss rate with respect to a UDP packet which is transmitted and received by the theoretical value packet transmitting/receiving unit 141. The RTT measuring unit 143 is a portion for measuring an RTT with respect to a UDP packet which is transmitted and received by the theoretical value packet transmitting/receiving unit 141.

The calculating unit 144 is a portion for calculating a theoretical value of a throughput, based on a packet loss rate measured by the loss rate measuring unit 142 and an RTT measured by the RTT measuring unit 143.

The receiving device 50 is a configuration that the theoretical value packet transmitting/receiving unit 54 is added to the receiving device 40. The theoretical value packet transmitting/receiving unit 54 is a portion for transmitting and receiving a UDP packet to and from the theoretical value packet transmitting/receiving unit 141 of the theoretical value measuring unit 14.

By configuring the throughput measuring apparatus 10 and the receiving device (40, 50) as described above, it becomes possible to output an upper limit closer to a true throughput as a measurement throughput, when a theoretical value exceeds the upper limit. Thus, it becomes possible to measure a throughput with high accuracy in an application layer.

Figure 6:
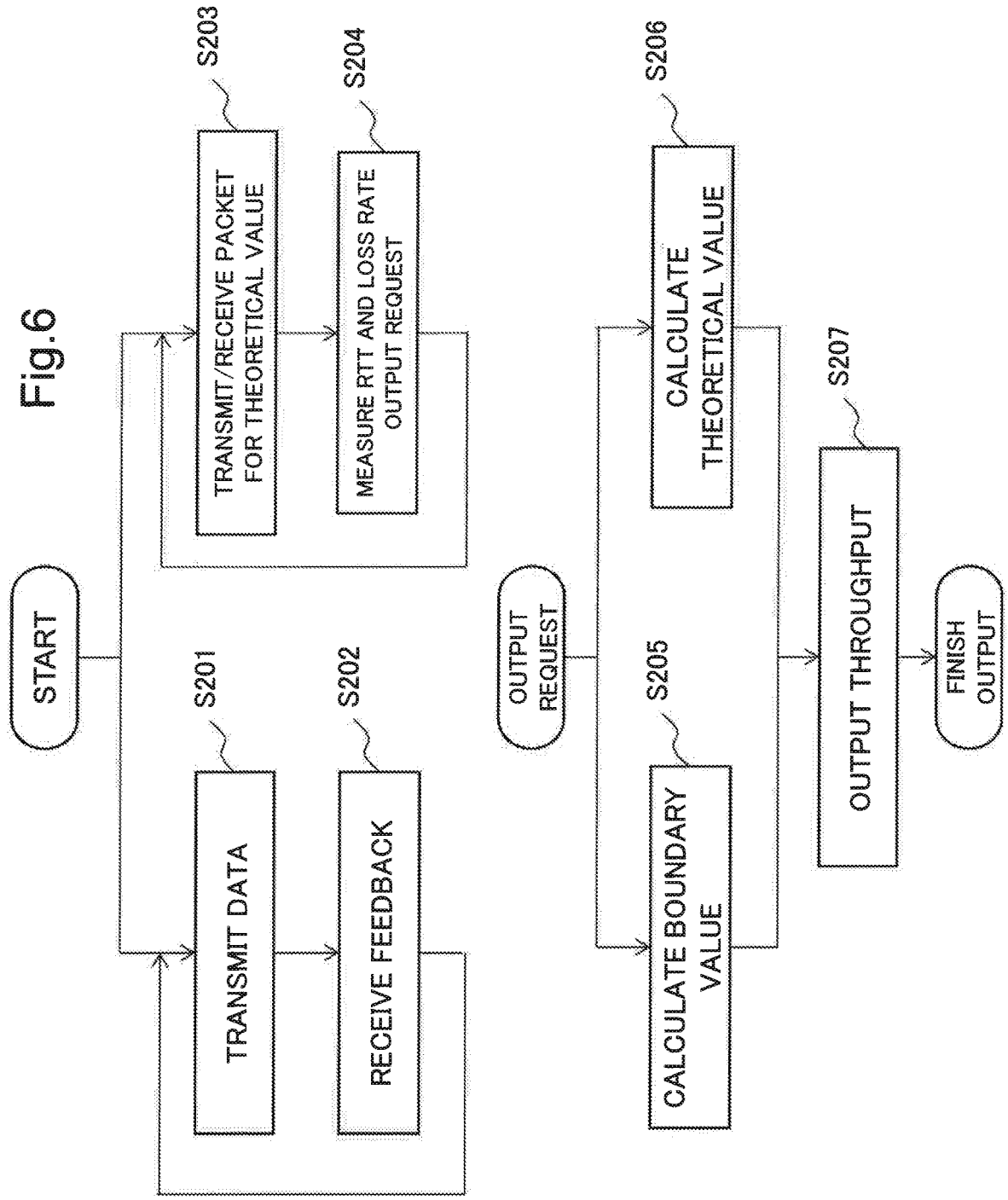
FIG. 6 shows a diagram illustrating an operation example of the throughput measuring apparatus in the second to fourth example embodiments of the present invention.

Next, FIG. 6 illustrates an example of an operation of the throughput measuring apparatus 10.

First of all, the data transmitting unit 11 of the throughput measuring apparatus 10 transmits TCP data to the data receiving unit 41 of the receiving device 50 (Step S201).

Herein, it is assumed that the data transmitting unit 11 transmits data di (i=1, 2, . . . ) of a data size di_size [bit]. In this case, an application layer of the receiving device 50 receives data di_fj (j=1 to n), which is fragmented into a size of a receiving buffer. Herein, when the received data are not defective, a relationship between a size di_fj_size of data di_fj and di_size is expressed by Eq. (1).

$$di\_size = \sum_{j=1}^{n} di\_fj\_size \qquad \text{Eq. (1)}$$

When a sum of data sizes of fragmented pieces of data reaches the aforementioned data size, the measuring unit 42 of the receiving device 50 transfers, to the feedback transmitting unit 43, a receiving start time (time when di_f1 is received) di_f1_t, and a receiving completion time (time when di_fn is received) di_fn_t. The feedback transmitting unit 43 transmits the receiving start time di_f1_t and the receiving completion time di_fn_t to the feedback receiving unit 12 of the throughput measuring apparatus 10. Then, the feedback receiving unit 12 receives feedback (Step S202).

The boundary value calculating unit 13 stores a lapse of receiving time di_t of data di, specifically, a lapse of time [sec] from the receiving start time di_f1_t until the receiving completion time di_fn_t, and a transmitted data size di_size [bit]. In this case, a relationship between a receiving start time, a receiving completion time, and a lapse of time is as illustrated in FIG. 7.

Figure 7:
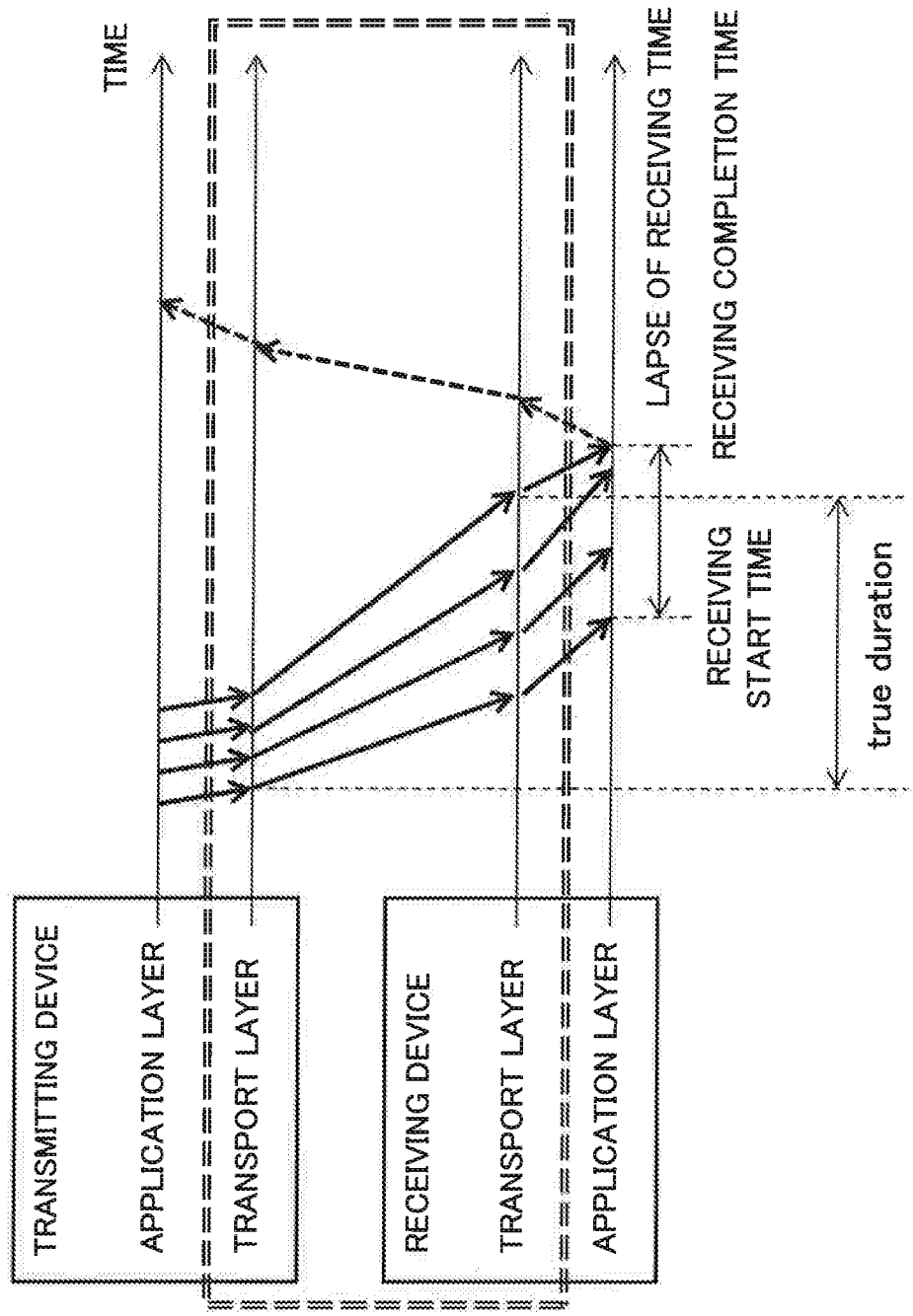
FIG. 7 shows a diagram illustrating an example of an upper limit calculating method in the second and fourth example embodiments of the present invention.

FIG. 7 is a diagram illustrating a lapse of time of measurement data transmitted by a transmitting device. A receiving start time is a time when an application layer of a receiving device starts receiving measurement data, and a receiving completion time is a time when the application layer of the receiving device completes receiving the measurement data. Further, a lapse of receiving time is a lapse of time from a receiving start time until a receiving completion time.

Then, when a request for outputting a throughput is received, the boundary value calculating unit 13 calculates an upper limit of a throughput (Step S205). When it is assumed that the feedback receiving unit 12 receives feedback m times during a predetermined time, an upper limit may be calculated as Eq. 2, for example. Since it is often the case that a lapse of receiving time of data includes an error, in the present example embodiment, an upper limit is calculated from feedback for a predetermined time in order to reduce a measurement error.

$$\text{upper limit} = \sum_{i=1}^{m}(di\_size)/\sum_{i=1}^{m}(di\_t) \text{ [bps]} \qquad \text{Eq. (2)}$$

As a method for calculating an upper limit from feedback for a predetermined time, there may be a method for calculating di_size/di_t of each piece of data di, and calculating an average value from data d0 to data dm. However, since a lapse of receiving time di_t may become zero when a size di_size of data di is small, di_size/di_t may diverge to infinity. In view of the above, it is desirable to use a method in which a value acquired by summing di_t corresponding to m times is used, as expressed by Eq. 2.

Further, the theoretical value measuring unit 14 of the throughput measuring apparatus 10 calculates a theoretical value of a throughput. In the present example embodiment, a method for calculating a TCP throughput from an RTT and a packet loss rate between the throughput measuring apparatus 10 and the receiving device 50 is described.

First of all, the theoretical value packet transmitting/receiving unit 141 of the throughput measuring apparatus 10 transmits and receives a UDP packet for theoretical value measurement to and from the theoretical value packet transmitting/receiving unit 54 of the receiving device 50 (Step S203). Then, the loss rate measuring unit 142 measures a packet loss rate, and the RTT measuring unit 143 measures an RTT (Step S204). Then, when a request for outputting a throughput is received, the calculating unit 144 calculates a theoretical value of a throughput (Step S206).

Figure 8:
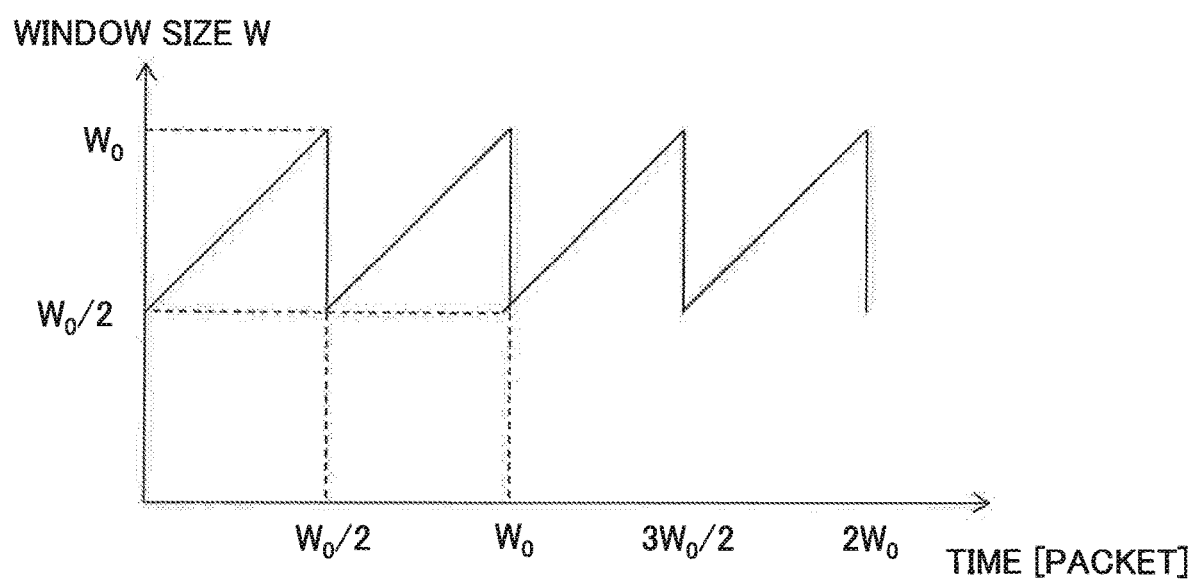
FIG. 8 shows a diagram illustrating an example of a theoretical value calculating method in the second to fourth example embodiments of the present invention.

An example of a method for calculating a theoretical value of a TCP throughput is described using FIG. 8. In the present example embodiment, a simple theoretical value calculating method in a case where a congestion control method of a TCP is TCP New Reno is described. It is also possible to calculate a theoretical value by using a method other than the method described herein.

It is assumed that a relationship between a TCP window size W and time changes as illustrated in FIG. 8 in accordance with TCP New Reno. In a case of TCP New Reno, when packet loss occurs by congestion, a window size W is reduced to one-half of a window size W0 when packet loss occurs, and a window size is increased for each packet. Therefore, a W0/2 packet is required before the window size, which is reduced to W0/2, returns to W0. In this case, a relationship between a packet loss rate p and a window size W0 when packet loss occurs is as expressed by Eq. 3.

$$\frac{1}{p} = \frac{3W0^2}{8} \qquad \text{Eq. (3)}$$

Further, in a state of FIG. 8, an amount of data to be transmitted during a time W0/2 [packet] becomes 3W0^2/8 [packet]. Therefore, it is possible to calculate a theoretical value of a TCP throughput as expressed by Eq. 4 by using a maximum segment size (MSS) [bit] and an RTT.

$$\text{theoretical value} = \frac{MSS \times \frac{3W0^2}{8}}{RTT \times \frac{W0}{2}} \qquad \text{Eq. (4)}$$

Then, when Eq. 4 is modified by using Eq. 3, Eq. 5 is acquired. Therefore, it becomes possible to calculate a theoretical value by a packet loss rate and an RTT measured by the loss rate measuring unit 142 and the RTT measuring unit 143.

$$\text{theoretical value} = \frac{MSS \times C}{RTT \times \sqrt{p}}, C = \sqrt{\frac{3}{2}} \qquad \text{Eq. (5)}$$

Figure 9:
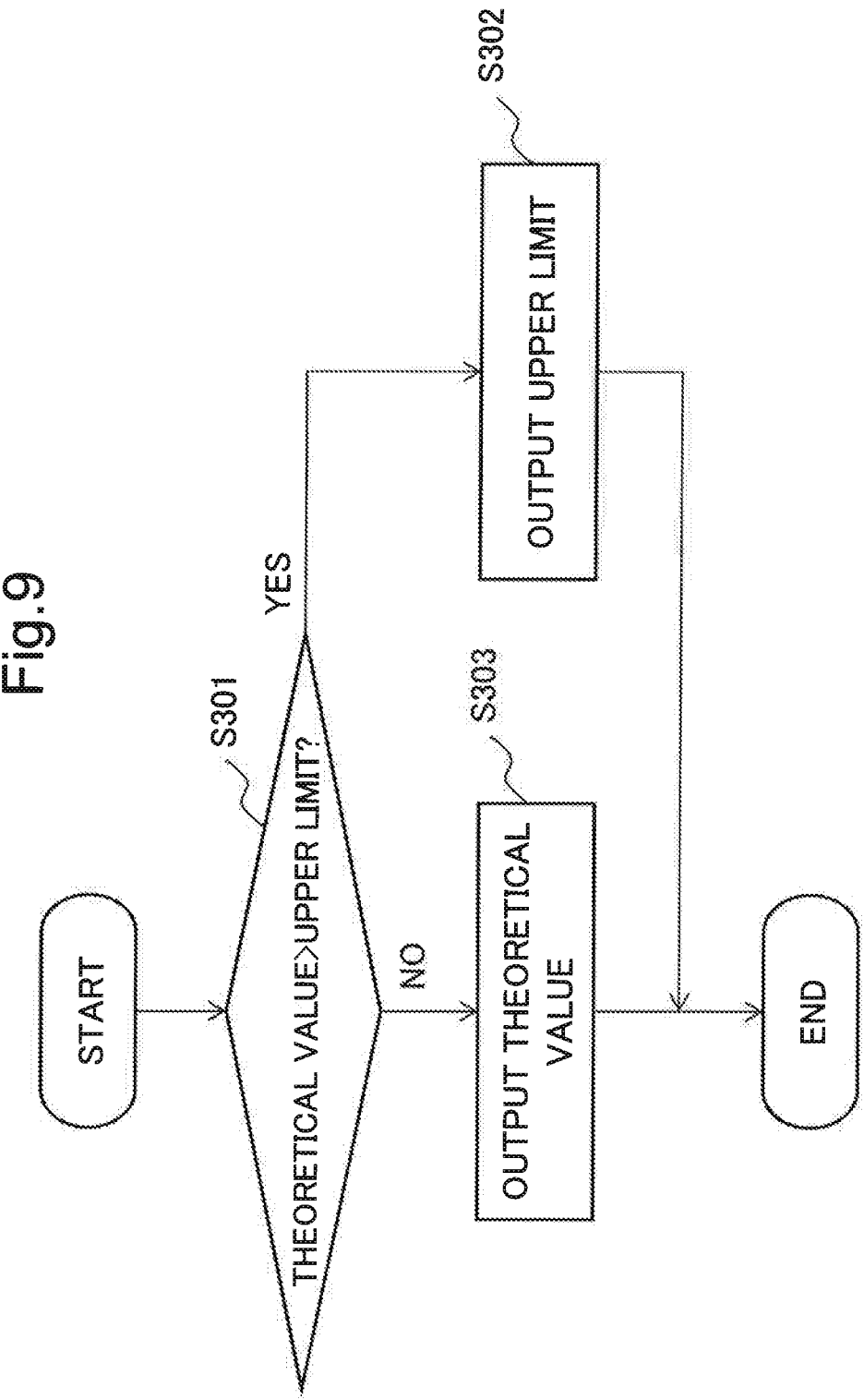
FIG. 9 shows a diagram illustrating an operation example of an output unit in the second example embodiment of the present invention.

After calculating an upper limit (Step S205) and calculating a theoretical value (Step S206), the output unit 15 outputs a throughput (Step S207). FIG. 9 illustrates a throughput output operation by the output unit 15. When a theoretical value is larger than an upper limit (Step S301), the output unit 15 outputs the upper limit (Step S302). Further, when a theoretical value is equal to or smaller than an upper limit, the output unit 15 outputs the theoretical value (Step S303).

As illustrated in FIG. 7, a lapse of receiving time to be used when an upper limit of a throughput is calculated is smaller than a true transmission time (true duration). Therefore, a true throughput becomes smaller than an upper limit calculated in the present example embodiment. Thus, when a theoretical value is larger than an upper limit, it is possible to judge that accuracy of a theoretical value is low. Then, by outputting an upper limit closer to a true throughput as a measured throughput, it becomes possible to enhance accuracy of the measured throughput.

By operating the throughput measuring apparatus 10 as described above, it becomes possible to measure a throughput with high accuracy in an application layer.

Next, an operation of the throughput measuring apparatus 10 is described using specific numerical values.

Data to be transmitted between the throughput measuring apparatus 10 and the receiving device 50 are, for example, data such as a video frame in live video streaming, and are intermittently transmitted.

It is assumed that the throughput measuring apparatus 10 transmits video data of thirty frames per second to the receiving device 50. Further, it is assumed that the throughput measuring apparatus 10 receives a request for outputting a throughput one time per second, and outputs the throughput.

When the data transmitting unit 11 transmits a video frame i (i=1 to 30) to the data receiving unit 41, the data receiving unit 41 starts receiving a fragmented video frame i_f (f=1 to n).

The measuring unit 42 of the receiving device 50 holds a receiving start time i_1_$t$ of a fragmented video frame i_1. When receiving the video frame i is completed, the measuring unit 42 holds a receiving completion time i_n_t of a last piece of fragmented data i_n of the video frame i. Then, the feedback transmitting unit 43 transmits feedback including the receiving start time i_1_$t$ and the receiving completion time i_n_t to the feedback receiving unit 12 of the throughput measuring apparatus 10.

The feedback receiving unit 12 receives feedback from the feedback transmitting unit 43. Then, the boundary value calculating unit 13 holds a lapse of receiving time i_t from the receiving start time i_1_$t$ until the receiving completion time i_n_t. Further, the boundary value calculating unit 13 holds a data amount i_size of the video frame i transmitted by the data transmitting unit 11.

In this way, transmitting and receiving the video frame i is repeated from i=1 until i=30 (for one second). Then, the boundary value calculating unit 13 calculates an upper limit of a throughput by using Eq. 2. In Eq. 2, when it is assumed that m is 30, di_size is i_size, and di_t is i_t, it is possible to calculate an upper limit. Herein, it is assumed that an upper limit is calculated to be 2.1 Mbps.

Further, the theoretical value packet transmitting/receiving unit 141 of the theoretical value measuring unit 14 of the throughput measuring apparatus 10 transmits and receives a UDP packet to and from the theoretical value packet transmitting/receiving unit 54 of the receiving device 50, and measures an RTT and a packet loss rate.

It is possible to use an arbitrary method as a method for measuring an RTT and a packet loss rate.

Figure 10:
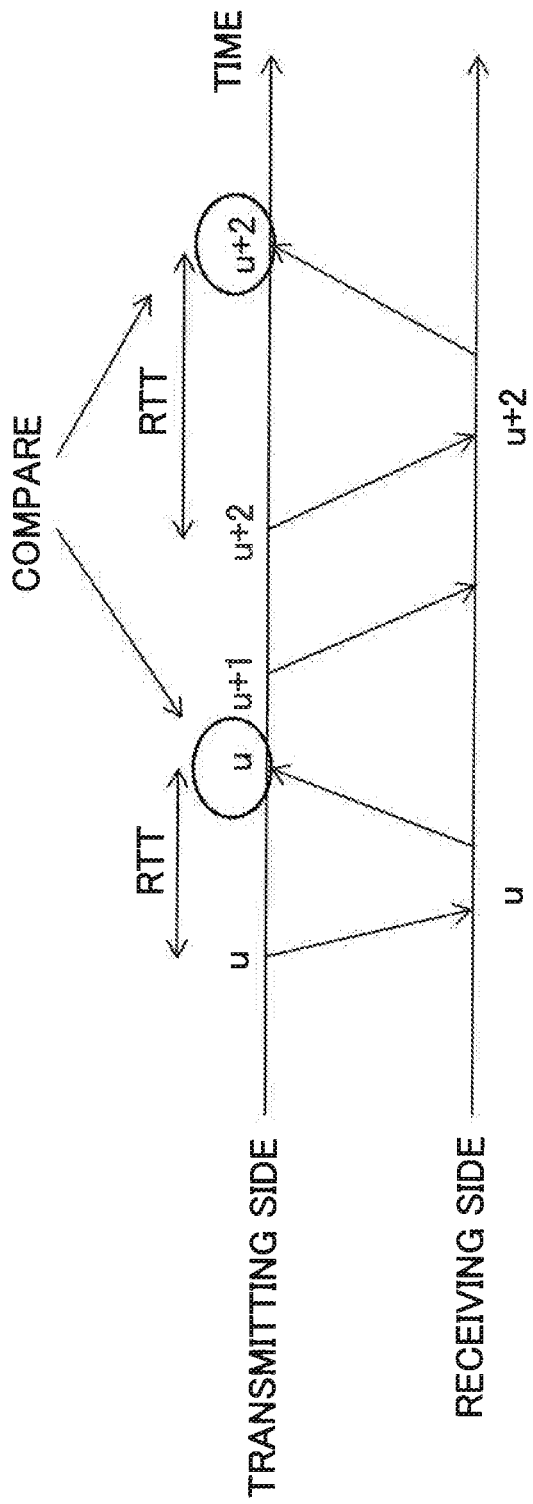
FIG. 10 shows a diagram illustrating an example of the theoretical value calculating method in the second to fourth example embodiments of the present invention.

An example of a method for measuring an RTT and a packet loss rate is described using FIG. 10. FIG. 10 is a diagram illustrating a lapse of time of a packet to be transmitted and received between a transmitting side and a receiving side, and a sequence number of each packet.

The theoretical value packet transmitting/receiving unit 141 (transmitting side) holds a sequence number u of a received UDP packet, and transmits a UDP packet having a sequence number (u+1). Further, the theoretical value packet transmitting/receiving unit 54 (receiving side) transmits a UDP packet of the same sequence number as the received UDP packet. Then, by comparing the sequence number of the received UDP packet and the sequence number of a UDP packet that is received immediately before the received UDP packet, the loss rate measuring unit 142 is able to determine presence or absence of packet loss. In a case of an example of FIG. 10, since the sequence number of a packet that is received immediately before the received packet is u when the packet having a sequence number (u+2) is received, it is possible to determine that a packet loss occurs.

Further, the RTT measuring unit 143 is able to measure, as an RTT, a difference between a transmitting time of a UDP packet having a sequence number u and a receiving time of the UDP packet having the sequence number u.

Then, the theoretical value measuring unit 14 calculates a theoretical value by using Eq. 5, for example. Herein, it is assumed that a theoretical value is calculated to be 2.6 Mbps.

After measuring an upper limit and a theoretical value, the output unit 15 outputs the upper limit when the theoretical value is larger than the upper limit, and outputs the theoretical value when the theoretical value is equal to or smaller than the upper limit. In this example, since the upper limit is 2.1 Mbps and the theoretical value is 2.6 Mbps, the upper limit 2.1 Mbps is output.

As described above, in the second example embodiment of the present invention, feedback relating to a data receiving time is received from the receiving device, and an upper limit of a throughput is calculated based on the feedback. Then, when a theoretical value is larger than the upper limit, the upper limit is output. Therefore, it becomes possible to output the upper limit as a throughput, when a theoretical value becomes larger than a true throughput by external disturbance. Therefore, it becomes possible to measure a throughput with high accuracy in an application layer.

Third Example Embodiment

Next, a third example embodiment of the present invention is described.

In the second example embodiment, an upper limit is calculated as a boundary value. In the present example embodiment, a case where a throughput measuring apparatus 10 calculates a lower limit as a boundary value is specifically described.

First of all, a configuration example of the throughput measuring apparatus 10 and a receiving device 40 in the present example embodiment is described using FIG. 1 and FIG. 3.

A configuration example of the throughput measuring apparatus 10 is similar to that of the first example embodiment (FIG. 1). As illustrated in FIG. 3, the throughput measuring apparatus 10 transmits and receives data to and from the receiving device 40 via a network in a similar manner as the throughput measuring apparatus 10 in the first example embodiment.

A data transmitting unit 11 of the throughput measuring apparatus 10 is a portion for transmitting data to the receiving device 40. In the present example embodiment, data are intermittently transmitted to the receiving device 40 by a TCP.

A feedback receiving unit 12 is a portion for receiving feedback indicating data reception is completed from the receiving device 40.

A boundary value calculating unit 13 is a portion for calculating a lower limit of a throughput, based on a transmitting start time of data, a feedback receiving time when feedback is received, and a transmitted data amount of data. A theoretical value measuring unit 14 is a portion for measuring a theoretical value of a throughput. An output unit 15 is a portion for outputting a lower limit when a theoretical value is smaller than the lower limit, and outputting a theoretical value when the theoretical value is equal to or larger than a lower limit.

The receiving device 40 includes a data receiving unit 41, a measuring unit 42, and a feedback transmitting unit 43.

The data receiving unit 41 of the receiving device 40 is a portion for receiving data transmitted by the data transmitting unit 11 of the throughput measuring apparatus 10. Data to be received by the data receiving unit 41 are fragmented into a size of a receiving buffer, and then received.

The measuring unit 42 is a portion for notifying the feedback transmitting unit 43 of receiving completion when data reception is completed.

The feedback transmitting unit 43 is a portion for transmitting feedback to the feedback receiving unit 12 of the throughput measuring apparatus 10, when data reception is completed.

Note that an arbitrary method may be used as a method for measuring a theoretical value of a throughput in the present example embodiment. For example, it is possible to measure a theoretical value from an RTT and a packet loss rate by the theoretical value measuring unit 14 in FIG. 4 and the receiving device 50 in FIG. 5 in a similar manner as in the second example embodiment. Hereinafter, the present example embodiment is described by using the theoretical value measuring unit 14 in FIG. 4 as the theoretical value measuring unit 14, and the receiving device 50 in FIG. 5 in place of the receiving device 40.

By configuring the throughput measuring apparatus 10 and the receiving device (40, 50) as described above, it becomes possible to output a lower limit closer to a true throughput as a measured throughput, when a theoretical value becomes lower than the lower limit. Thus, it becomes possible to measure a throughput with high accuracy in an application layer.

Next, an example of an operation of the throughput measuring apparatus 10 is described using FIG. 6.

First of all, the data transmitting unit 11 transmits TCP data to the receiving device 50 (Step S201).

Herein, it is assumed that the data transmitting unit 11 transmits data di (i=1, 2, . . . ) of a data size di_size [bit]. In this case, an application layer of the receiving device 50 receives data di_fj (j=1 to n), which is fragmented into a size of a receiving buffer.

The measuring unit 42 of the receiving device 50 notifies the feedback transmitting unit 43 of receiving completion, when a sum of data sizes of pieces of the fragmented data reaches the aforementioned data size. The feedback transmitting unit 43 transmits feedback indicating receiving completion to the feedback receiving unit 12 of the throughput measuring apparatus 10. Then, the feedback receiving unit 12 receives feedback (Step S202).

Figure 11:
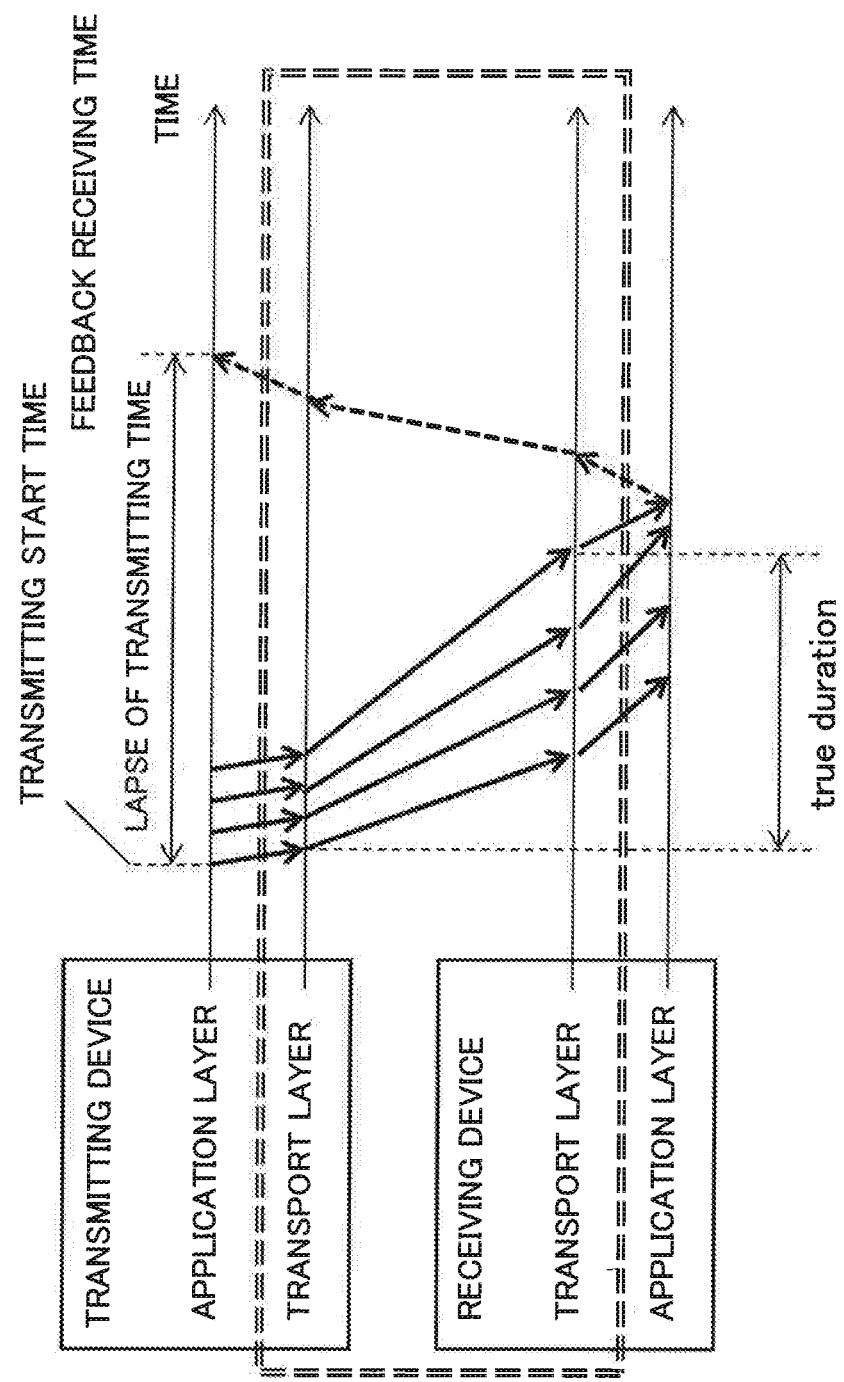
FIG. 11 shows a diagram illustrating an example of a lower limit calculating method in the third and fifth example embodiments of the present invention.

The boundary value calculating unit 13 calculates di_rtt being an RTT of data di_from a time di_start when transmitting the data di is started and a time di_end when feedback information of the data di is received. Then, the di_rtt being the RTT of the data di and a data size di_size [bit] are stored. FIG. 11 illustrates a relationship between a transmitting start time, a feedback receiving time, and a lapse of transmitting time (RTT).

FIG. 11 is a diagram illustrating a lapse of time of measurement data transmitted by a transmitting device. A transmitting start time is a time when transmitting measurement data is started by an application layer of the transmitting device, and a feedback receiving time is a time when feedback transmitted from a receiving device is received by the application layer of the transmitting device. An application layer of the receiving device transmits feedback to the transmitting device when receiving measurement data is completed. Further, a lapse of transmitting time is a lapse of time from a transmitting start time until a feedback receiving time.

Then, when a request for outputting a throughput is received, the boundary value calculating unit 13 calculates a lower limit of a throughput (Step S205). When it is assumed that the feedback receiving unit 12 receives feedback m times during a predetermined time, a lower limit may be calculated as Eq. 6, for example. Since it is often the case that a lapse of transmitting time of data includes an error, in the present example embodiment, a lower limit is calculated from feedback for a predetermined time in order to reduce a measurement error.

$$\text{lower limit} = \Sigma_{i=1}^{m}(di\_size)/\Sigma_{i=1}^{m}(di\_rtt) \text{ [bps]} \qquad \text{Eq. (6)}$$

Note that a base station performs buffering in order to schedule a packet in a mobile network. Therefore, when an amount of data of feedback is small, a propagation delay of feedback may be increased by an influence of buffering, and di_rtt may become larger than a true duration. In this case, when a lower limit is calculated by Eq. 6, the lower limit may be approximate to zero. In view of the above, in a network where it is presumed that a propagation delay of feedback becomes large, it may be possible to make di_rtt closer to a true duration by using, as di_rtt, a value acquired by subtracting, from di_rtt, a time which is presumed to be required minimally for transmitting feedback. For example, when it is presumed that a transmission from a receiving side to a transmitting side takes more time than a transmission from the transmitting side to the receiving side, a time equal to one-half of an RTT measured by the theoretical value measuring unit 14 may be used as a time, which is presumed to be required minimally for transmitting feedback.

Further, the theoretical value measuring unit 14 of the throughput measuring apparatus 10 calculates a theoretical value of a throughput.

First of all, a theoretical value packet transmitting/receiving unit 141 of the throughput measuring apparatus 10 transmits and receives a UDP packet for theoretical value measurement to and from a theoretical value packet transmitting/receiving unit 54 of the receiving device 50 (Step S203). Next, a loss rate measuring unit 142 measures a packet loss rate, and an RTT measuring unit 143 measures an RTT (Step S204). Then, when a request for outputting a throughput is received, a calculating unit 144 calculates a theoretical value of a throughput (Step S206). Since an example of a method for calculating a theoretical value is similar to the second example embodiment, description thereof is omitted.

Figure 12:
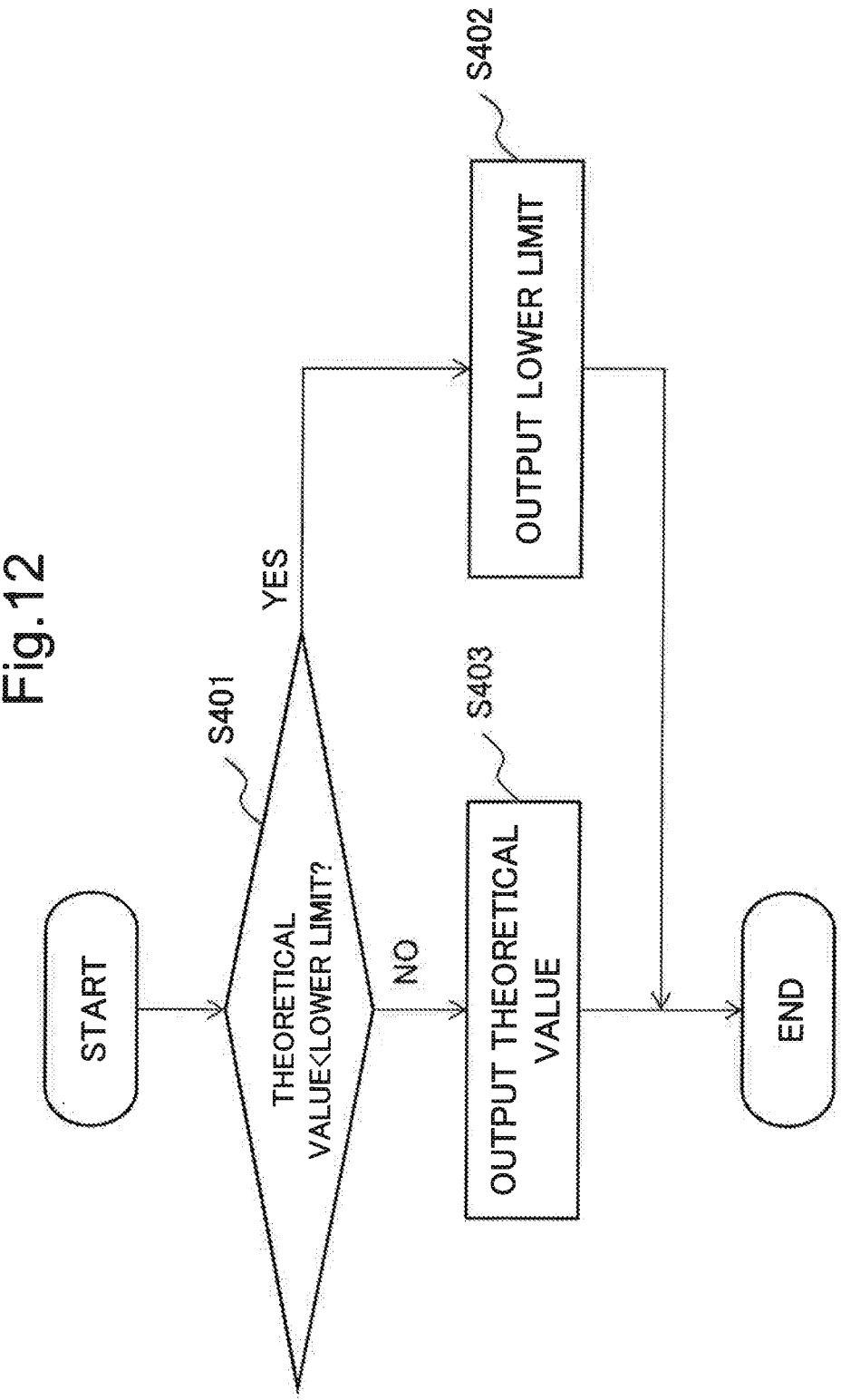
FIG. 12 shows a diagram illustrating an operation example of an output unit in the third example embodiment of the present invention.

After calculating a boundary value (lower limit) (Step S205) and calculating a theoretical value (Step S206), the output unit 15 outputs a throughput (Step S207). FIG. 12 illustrates a throughput output operation by the output unit 15. When a theoretical value is smaller than a lower limit (Step S401), the output unit 15 outputs the lower limit (Step S402). Further, when a theoretical value is equal to or larger than a lower limit, the output unit 15 outputs the theoretical value (Step S403).

As illustrated in FIG. 11, a lapse of transmitting time to be used when a lower limit of a throughput is calculated becomes larger than a true transmission time (true duration). Therefore, a true throughput becomes larger than a lower limit calculated in the present example embodiment. Thus, when a theoretical value is smaller than a lower limit, it is possible to judge that accuracy of a theoretical value is low.

Then, by outputting a lower limit closer to a true throughput as a measured throughput, it becomes possible to enhance accuracy of the measured throughput.

By operating the throughput measuring apparatus 10 as described above, it becomes possible to measure a throughput with high accuracy in an application layer.

Next, an operation of the throughput measuring apparatus 10 is described by using specific numerical values.

Data to be transmitted between the throughput measuring apparatus 10 and the receiving device 50 are, for example, data such as a video frame in live video streaming, and are intermittently transmitted.

It is assumed that the throughput measuring apparatus 10 transmits video data of thirty frames per second to the receiving device 50. Further, it is assumed that the throughput measuring apparatus 10 receives a request for outputting a throughput one time per second, and outputs the throughput.

When the data transmitting unit 11 transmits a video frame i (i=1 to 30) to the data receiving unit 41, the data receiving unit 41 starts receiving a fragmented video frame i_f (f=1 to n).

The measuring unit 42 of the receiving device 50 notifies the feedback transmitting unit 43 of receiving completion, when receiving the video frame i is completed. Then, the feedback transmitting unit 43 transmits feedback to the feedback receiving unit 12 of the throughput measuring apparatus 10.

The feedback receiving unit 12 receives feedback from the feedback transmitting unit 43. Then, the boundary value calculating unit 13 holds a lapse of transmitting time i_rtt from a transmitting start time f_i_start of the video frame i until a time f_i_end when feedback is received. Further, the boundary value calculating unit 13 holds a data amount i_size of the video frame i transmitted by the data transmitting unit 11.

In this way, transmitting and receiving the video frame i is repeated from i=1 until i=30 (for one second). Then, the boundary value calculating unit 13 calculates a lower limit of a throughput by using Eq. 6. In Eq. 6, when it is assumed that m is 30, di_size is i_size, and di_rtt is i_rtt, it is possible to calculate a lower limit. Herein, it is assumed that a lower limit is calculated to be 1.7 Mbps.

Further, the theoretical value packet transmitting/receiving unit 141 of the theoretical value measuring unit 14 of the throughput measuring apparatus 10 transmits and receives a UDP packet to and from the theoretical value packet transmitting/receiving unit 54 of the receiving device 50, and measures an RTT and a packet loss rate. Then, the theoretical value measuring unit 14 calculates a theoretical value. A method for measuring an RTT and a packet loss rate and a method for calculating a theoretical value are similar to the second example embodiment. Herein, it is assumed that a theoretical value is calculated to be 2.6 Mbps.

After measuring a lower limit and a theoretical value, the output unit 15 outputs the lower limit when the theoretical value is smaller than the lower limit, and outputs the theoretical value when the theoretical value is equal to or larger than the lower limit. In this example, since the lower limit is 1.7 Mbps and the theoretical value is 2.6 Mbps, the theoretical value 2.6 Mbps is output.

As described above, in the third example embodiment of the present invention, feedback indicating data reception is completed is received from the receiving device, and a lower limit of throughput is calculated based on a transmitting start time of data, a feedback receiving time, and an amount of transmitted data. Then, when a theoretical value is smaller than the lower limit, the lower limit is output. Thus, it becomes possible to output a lower limit as a throughput, when a theoretical value becomes smaller than a true throughput by external disturbance. Therefore, it becomes possible to measure a throughput with high accuracy in an application layer.

Fourth Example Embodiment

Next, a fourth example embodiment of the present invention is described.

The present example embodiment is a configuration, in which a boundary value calculating unit performs both calculation of an upper limit and a lower limit of a throughput.

A configuration example of a throughput measuring apparatus 10 in the present example embodiment is similar to that shown in FIG. 1. The throughput measuring apparatus 10 includes a data transmitting unit 11, a feedback receiving unit 12, a boundary value calculating unit 13, a theoretical value measuring unit 14, and an output unit 15.

The data transmitting unit 11 is a portion for transmitting data to a receiving device. In the present example embodiment, data is intermittently transmitted to a receiving device by a TCP.

The feedback receiving unit 12 is a portion for receiving, from a receiving device, feedback relating to a data receiving time. In the present example embodiment, a receiving start time and a receiving completion time of data are received as feedback.

The boundary value calculating unit 13 is a portion for calculating an upper limit and a lower limit of a throughput. The boundary value calculating unit 13 calculates an upper limit of a throughput, based on feedback and an amount of transmitted data. Further, the boundary value calculating unit 13 calculates a lower limit of a throughput, based on a transmitting start time of data, a feedback receiving time when feedback is received, and an amount of transmitted data.

The theoretical value measuring unit 14 is a portion for measuring a theoretical value of a throughput.

The output unit 15 is a portion for outputting an upper limit when a theoretical value is larger than the upper limit, outputting a lower limit when a theoretical value is smaller than the lower limit, and outputting a theoretical value when the theoretical value is not larger than the upper limit but not smaller than the lower limit.

By configuring the throughput measuring apparatus 10 as described above, it becomes possible to measure a throughput with high accuracy in an application layer.

Next, an example of an operation of the throughput measuring apparatus 10 is described using FIG. 6.

In the present example embodiment, calculating an upper limit and a lower limit is performed in Step S205, and one of the upper limit, the lower limit, and a theoretical value is output in Step S207.

In the present example embodiment, a receiving start time and a receiving completion time are received by feedback. Then, an upper limit of a throughput is calculated from the receiving start time, the receiving completion time, and an amount of transmitted data. Further, a lower limit of a throughput is calculated from a transmitting start time when transmitting data is started, a feedback receiving time when feedback is received, and an amount of transmitted data.

Figure 13:
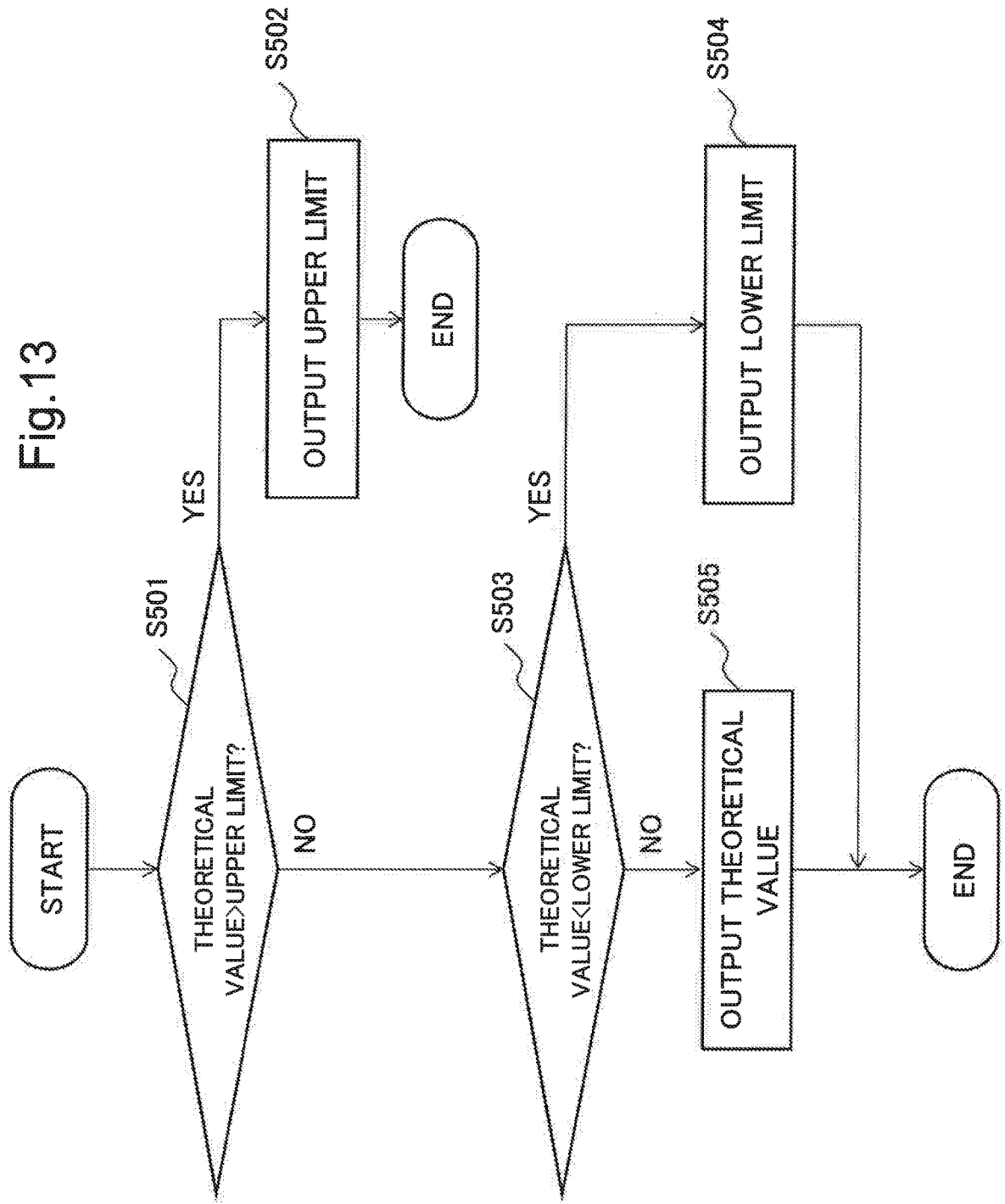
FIG. 13 shows a diagram illustrating an operation example of an output unit in the fourth example embodiment of the present invention.

Further, FIG. 13 illustrates an example of an operation of the output unit 15. First of all, when a theoretical value is larger than an upper limit (Step S501), the output unit 35 outputs the upper limit (Step S502). Further, when a theoretical value is smaller than a lower limit (Step S503), the output unit 35 outputs the lower limit (step S504). Then, when a theoretical value is not smaller than the lower limit but not larger than the upper limit, the output unit 35 outputs the theoretical value (Step S505).

Since other operations are similar to the second and third example embodiments, description thereof is omitted.

Figure 14:
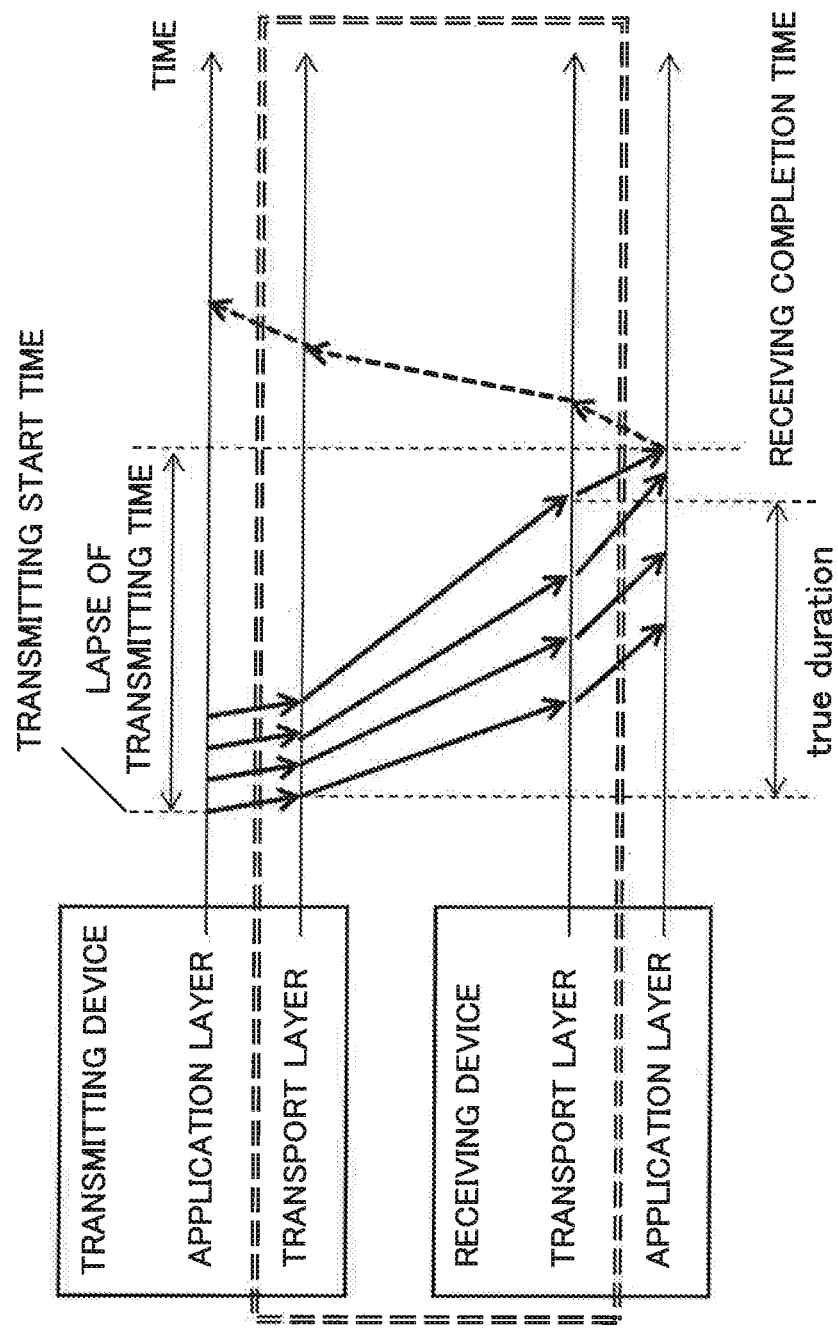
FIG. 14 shows a diagram illustrating an example of a lower limit calculating method in the fourth example embodiment of the present invention.

Note that regarding calculation of a lower limit, it is also possible to use a lapse of time from a transmitting start time until a receiving completion time, as illustrated in FIG. 14, in place of using a lapse of time from a transmitting start time until a feedback receiving time. FIG. 14 is a diagram illustrating a lapse of transmitting time. In FIG. 11, a lapse of time from a transmitting start time until a feedback receiving time is defined as a lapse of transmitting time. In FIG. 14, however, a lapse of time from a transmitting start time until a receiving completion time is defined as a lapse of transmitting time. It is possible to receive a receiving completion time by including the receiving completion time in feedback. In the present example embodiment, a receiving completion time is received for calculating an upper limit. However, in a method in which a transmitting start time and a receiving completion time are used, when clocks of a transmitting device and a receiving device are different, measurement accuracy of a throughput may be lowered because a lapse of transmitting time is affected by a clock error. On the other hand, in a method in which a transmitting start time and a feedback receiving time are used, measuring a time is performed only by a transmitting device. Therefore, it becomes possible to calculate a lapse of transmitting time without being affected by a clock error.

By operating the throughput measuring apparatus 10 as described above, it becomes possible to measure a throughput with high accuracy in an application layer.

As described above, in the fourth example embodiment of the present invention, feedback relating to a data receiving time is received from the receiving device, and an upper limit of a throughput is calculated based on the feedback. Then, when a theoretical value is larger than an upper limit, the upper limit is output. Thus, it becomes possible to output an upper limit as a throughput, when a theoretical value becomes larger than a true throughput by external disturbance. Further, feedback indicating data reception is completed is received from the receiving device, and a lower limit of a throughput is calculated based on a transmitting start time of data, a feedback receiving time, and an amount of transmitted data. Then, when a theoretical value is smaller than a lower limit, the lower limit is output. Thus, it becomes possible to output a lower limit as a throughput, when a theoretical value becomes smaller than a true throughput by external disturbance. Therefore, it becomes possible to measure a throughput with high accuracy in an application layer.

Further, in the present example embodiment, since both an upper limit and a lower limit are used as a boundary value, it becomes possible to measure a throughput with enhanced accuracy.

[Hardware Configuration Example]

A configuration example of a hardware resource when the throughput measuring apparatus 10 in the aforementioned respective example embodiments of the present invention is implemented by using one information processing device (computer) is described. Note that the throughput measuring apparatus 10 may be implemented by using at least two information processing devices physically or functionally. Further, the throughput measuring apparatus 10 may be implemented as a dedicated device. Further, only a part of functions of the throughput measuring apparatus 10 may be implemented by using an information processing device.

Figure 15:
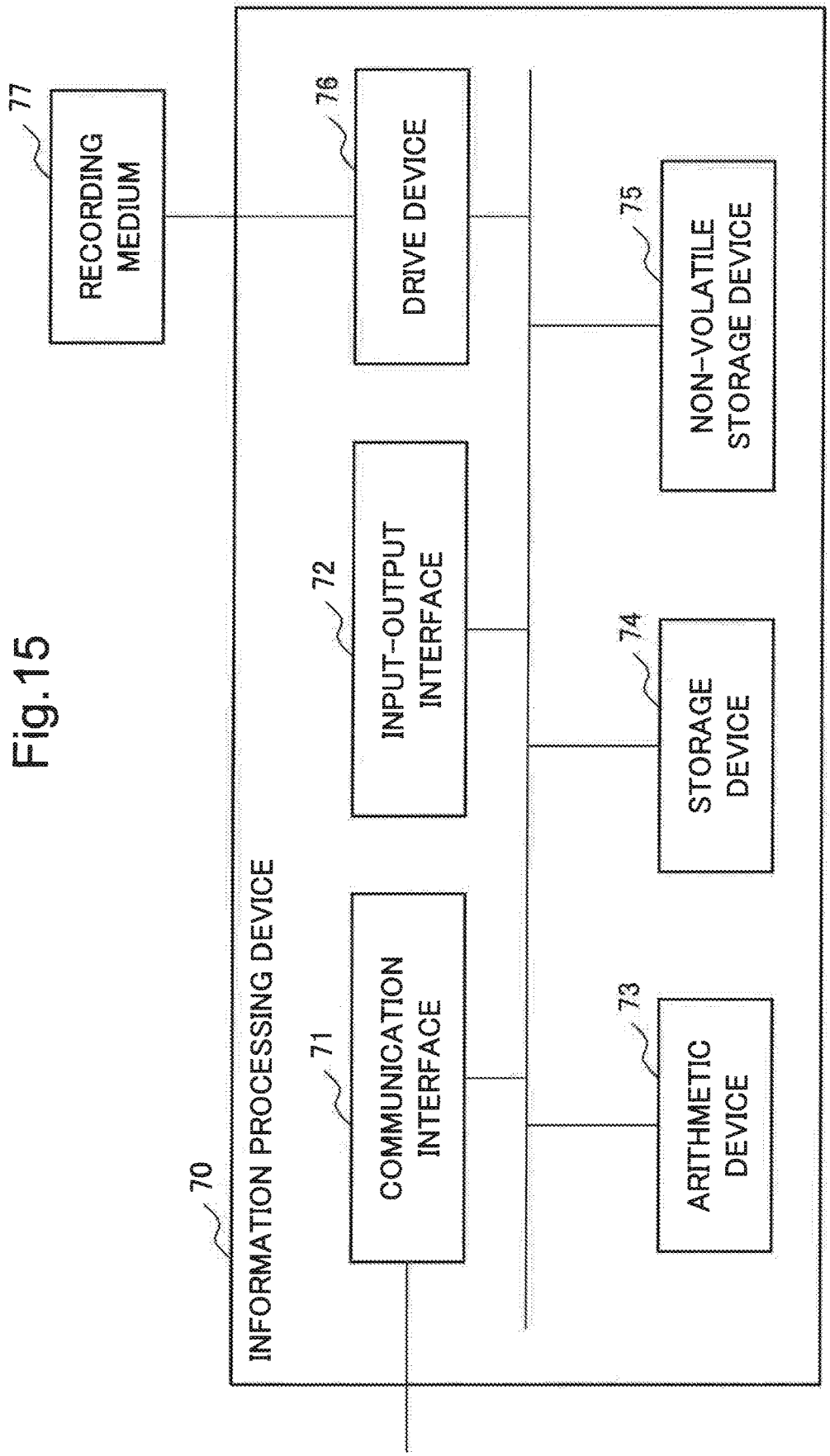
FIG. 15 shows a diagram illustrating a hardware configuration example of the respective example embodiments of the present invention.

FIG. 15 is a diagram schematically illustrating a hardware configuration example of an information processing device with which a throughput measuring apparatus of the respective example embodiments of the present invention is implementable. An information processing device 70 includes a communication interface 71, an input-output interface 72, an arithmetic device 73, a storage device 74, a non-volatile storage device 75, and a drive device 76.

The communication interface 71 is a communication means with which the throughput measuring apparatus 10 of the respective example embodiments communicates with an external device wiredly or/and wirelessly. Note that when the throughput measuring apparatus 10 is implemented by using at least two information processing devices, these devices may be connected in such a manner as to be able to communicate with each other via the communication interface 71.

The input-output interface 72 is a man-machine interface such as a keyboard being an example of an input device, and a display as an output device.

The arithmetic device 73 is an arithmetic processing device such as a general-purpose central processing unit (CPU) and a microprocessor. The arithmetic device 73 is able to read various types of programs stored in the non-volatile storage device 75 on the storage device 74, and execute processing in accordance with the read programs, for example.

The storage device 74 is a memory device such as a random access memory (RAM) referable from the arithmetic device 73, and stores programs, various data, and the like. The storage device 74 may be a volatile memory device.

The non-volatile storage device 75 is a non-volatile storage device such as a read only memory (ROM) and a flash memory, for example, and is able to store various types of programs, data, and the like.

The drive device 76 is a device for processing reading and writing data from and on a recording medium 77 to be described later.

The recording medium 77 is an arbitrary recording medium capable of recording data, such as an optical disc, a magneto-optical disk, and a semiconductor flash memory, for example.

The respective example embodiments of the present invention may be implemented by configuring the throughput measuring apparatus 10 by the information processing device 70 exemplified in FIG. 15, and supplying a program capable of implementing functions described in the respective example embodiments, for example.

In this case, it is possible to implement an example embodiment by causing the arithmetic device 73 to execute a program supplied to a throughput measuring apparatus. Further, not all of the functions of a throughput measuring apparatus but a part of the functions may be configured by the information processing device 70.

Further, the program may be recorded in the recording medium 77, and the program may be stored in the non-volatile storage device 75 as necessary at a stage such as a stage of shipment of a throughput measuring apparatus, at a stage of operation, or the like. Note that, in this case, a method for supplying the program may be a method for installing the program in a throughput measuring apparatus by using an appropriate jig at a manufacturing stage before shipment, at an operation stage, or the like. Further, a method for supplying the program may be a general procedure such as a method for downloading a program from the exterior via a communication line such as the Internet.

The whole or part of the example embodiments disclosed above can be described as, but not limited to, the following supplementary notes.

(Supplementary Note 1)

A throughput measuring apparatus comprising:

a data transmitting means for transmitting data to a receiving device;

a feedback receiving means for receiving a feedback indicating a receiving completion of the data, from the receiving device;

a boundary value calculating means for calculating a boundary value of a range of values allowable for a throughput, based on the feedback and a transmitted data amount of the data;

a theoretical value measuring means for measuring a theoretical value of the throughput; and an output means for outputting the boundary value when the theoretical value falls outside the range, and outputting the theoretical value when the theoretical value falls within the range.

(Supplementary Note 2)

The throughput measuring apparatus according to Supplementary note 1, wherein the boundary value includes an upper limit, the boundary value calculating means calculates the upper limit, based on the feedback and the transmitted data amount of the data, and the output means outputs the upper limit when the theoretical value is larger than the upper limit.

(Supplementary Note 3)

The throughput measuring apparatus according to Supplementary note 2, wherein the feedback includes a receiving start time and a receiving completion time when the receiving device receives the data, and the boundary value calculating means calculates the upper limit, based on a lapse of receiving time from the receiving start time until the receiving completion time, and the transmitted data amount.

(Supplementary Note 4)

The throughput measuring apparatus according to Supplementary note 2, wherein the feedback includes a lapse of receiving time from a receiving start time until a receiving completion time when the receiving device receives the data, and the boundary value calculating means calculates the upper limit, based on the lapse of receiving time and the transmitted data amount.

(Supplementary Note 5)

The throughput measuring apparatus according to any one of Supplementary notes 2 to 4, wherein the feedback includes a received data amount when the receiving device receives the data, and the boundary value calculating means calculates the upper limit, based on the received data amount in place of the transmitted data amount.

(Supplementary Note 6)

The throughput measuring apparatus according to any one of Supplementary notes 1 to 5, wherein the boundary value includes a lower limit, the boundary value calculating means calculates the lower limit of the throughput, based on a transmitting start time when transmitting the data is started, a transmitting completion time, and the transmitted data amount, and the output means outputs the lower limit when the theoretical value is smaller than the lower limit.

(Supplementary Note 7)

The throughput measuring apparatus according to Supplementary note 6, wherein the transmitting completion time is a feedback receiving time when the feedback is received.

(Supplementary Note 8)

The throughput measuring apparatus according to Supplementary note 6, wherein the feedback includes a receiving completion time when the receiving device completes receiving the data, and the transmitting completion time is the receiving completion time.

(Supplementary Note 9)

The throughput measuring apparatus according to any one of Supplementary notes 1 to 8, wherein the theoretical value measuring means measures the theoretical value by a round trip time (RTT) and a packet loss rate.

(Supplementary Note 10)

The throughput measuring apparatus according to any one of Supplementary notes 1 to 9, wherein the transmitting means transmits the data by a transmission control protocol (TCP).

(Supplementary Note 11)

The throughput measuring apparatus according to any one of Supplementary notes 1 to 10, wherein the theoretical value measuring means transmits and receives a packet for theoretical value measurement to and from the receiving device.

(Supplementary Note 12)

A receiving device comprising:

a data receiving means for receiving data from a throughput measuring apparatus;

a measuring means for detecting a receiving completion of the data; and a feedback transmitting means for transmitting a feedback indicating the receiving completion to the throughput measuring apparatus, after the receiving completion.

(Supplementary Note 13)

The receiving device according to Supplementary note 12, wherein the measuring means measures a receiving completion time of the data, and the feedback includes the receiving completion time.

(Supplementary Note 14)

The receiving device according to Supplementary note 13, wherein the measuring means measures a receiving start time of the data, and the feedback includes the receiving start time.

(Supplementary Note 15)

The receiving device according to Supplementary note 12 or 13, wherein the measuring means measures a receiving start time and a receiving completion time of the data, and calculates a lapse of receiving time, and the feedback includes the lapse of receiving time.

(Supplementary Note 16)

The receiving device according to any one of Supplementary notes 12 to 15, wherein the measuring means measures a received data amount of the data, and the feedback includes the received data amount.

(Supplementary Note 17)

The receiving device according to any one of Supplementary notes 12 to 16, further comprising:
a theoretical value packet transmitting/receiving means for transmitting and receiving a packet for theoretical value measurement to and from the throughput measuring apparatus.

(Supplementary Note 18)
A throughput measuring system comprising:
the throughput measuring apparatus according to any one of Supplementary notes 1 to 11; and
the receiving device according to Supplementary note 12, wherein
the data transmitting means transmits the data to the data receiving means, and
the feedback receiving means receives the feedback from the feedback transmitting means.

(Supplementary Note 19)
A throughput measuring system comprising:
the throughput measuring apparatus according to Supplementary note 3 or 8; and
the receiving device according to Supplementary note 13, wherein
the data transmitting means transmits the data to the data receiving means, and
the feedback receiving means receives the feedback from the feedback transmitting means.

(Supplementary Note 20)
A throughput measuring system comprising:
the throughput measuring apparatus according to Supplementary note 3; and
the receiving device according to Supplementary note 14, wherein
the data transmitting means transmits the data to the data receiving means, and
the feedback receiving means receives the feedback from the feedback transmitting means.

(Supplementary Note 21)
A throughput measuring system comprising:
the throughput measuring apparatus according to Supplementary note 4; and
the receiving device according to Supplementary note 15, wherein
the data transmitting means transmits the data to the data receiving means, and
the feedback receiving means receives the feedback from the feedback transmitting means.

(Supplementary Note 22)
A throughput measuring system comprising:
the throughput measuring apparatus according to Supplementary note 5; and
the receiving device according to Supplementary note 16, wherein
the data transmitting means transmits the data to the data receiving means, and
the feedback receiving means receives the feedback from the feedback transmitting means.

(Supplementary Note 23)
A throughput measuring system comprising:
the throughput measuring apparatus according to Supplementary note 11; and
the receiving device according to Supplementary note 17, wherein
the data transmitting means transmits the data to the data receiving means,
the feedback receiving means receives the feedback from the feedback transmitting means, and
the theoretical value packet transmitting/receiving means of the throughput measuring apparatus transmits and receives the packet for theoretical value measurement to and from a theoretical value packet transmitting/receiving means of the receiving device.

(Supplementary Note 24)
A throughput measuring method comprising:
transmitting data to a receiving device;
receiving a feedback indicating a receiving completion of the data, from the receiving device;
calculating a boundary value of a range of values allowable for a throughput, based on the feedback and a transmitted data amount of the data;
measuring a theoretical value of the throughput; and
outputting the boundary value when the theoretical value falls outside the range, and outputting the theoretical value when the theoretical value falls within the range.

(Supplementary Note 25)
The throughput measuring method according to Supplementary note 24, wherein
the boundary value includes an upper limit, and
the throughput measuring method comprises calculating the upper limit, based on the feedback and the transmitted data amount of the data, and outputting the upper limit when the theoretical value is larger than the upper limit.

(Supplementary Note 26)
The throughput measuring method according to Supplementary note 25, wherein
the feedback includes a receiving start time and a receiving completion time when the receiving device receives the data, and
the throughput measuring method comprises calculating the upper limit, based on a lapse of receiving time from the receiving start time until the receiving completion time, and the transmitted data amount.

(Supplementary Note 27)
The throughput measuring method according to Supplementary note 25, wherein
the feedback includes a lapse of receiving time from a receiving start time until a receiving completion time when the receiving device receives the data, and
the throughput measuring method comprises calculating the upper limit, based on the lapse of receiving time and the transmitted data amount.

(Supplementary Note 28)
The throughput measuring method according to any one of Supplementary notes 25 to 27, wherein
the feedback includes a received data amount when the receiving device receives the data, and
the throughput measuring method comprises calculating the upper limit, based on the received data amount in place of the transmitted data amount.

(Supplementary Note 29)
The throughput measuring method according to any one of Supplementary notes 24 to 28, wherein
the boundary value includes a lower limit, and
the throughput measuring method comprises calculating the lower limit of the throughput, based on a transmitting start time when transmitting the data is started, a transmitting completion time, and the transmitted data amount, and outputting the lower limit when the theoretical value is smaller than the lower limit.

(Supplementary Note 30)
The throughput measuring method according to Supplementary note 29, wherein
the transmitting completion time is a feedback receiving time when the feedback is received.

(Supplementary Note 31)

The throughput measuring method according to Supplementary note 29, wherein the feedback includes a receiving completion time when the receiving device completes receiving the data, and the transmitting completion time is the receiving completion time.

(Supplementary Note 32)

The throughput measuring method according to any one of Supplementary notes 24 to 31, wherein the theoretical value is measured by a round trip time (RTT) and a packet loss rate.

(Supplementary Note 33)

The throughput measuring method according to any one of Supplementary notes 24 to 32, wherein the data is transmitted by a transmission control protocol (TCP).

(Supplementary Note 34)

The throughput measuring method according to any one of Supplementary notes 24 to 33, further comprising:

transmitting and receiving a packet for theoretical value measurement to and from the receiving device.

(Supplementary Note 35)

A receiving method comprising:

receiving data from a throughput measuring apparatus;

detecting a receiving completion of the data; and transmitting a feedback indicating the receiving completion to the throughput measuring apparatus, after the receiving completion.

(Supplementary Note 36)

The receiving method according to Supplementary note 35, wherein the receiving method comprises measuring a receiving completion time of the data, and the feedback includes the receiving completion time.

(Supplementary Note 37)

The receiving method according to Supplementary note 36, wherein the receiving method comprises measuring a receiving start time of the data, and the feedback includes the receiving start time.

(Supplementary Note 38)

The receiving method according to Supplementary note 35 or 36, wherein the receiving method comprises measuring a receiving start time and a receiving completion time of the data, and calculating a lapse of receiving time, and the feedback includes the lapse of receiving time.

(Supplementary Note 39)

The receiving method according to any one of Supplementary notes 35 to 38, wherein the receiving method comprises measuring a received data amount of the data, and the feedback includes the received data amount.

(Supplementary Note 40)

The receiving method according to any one of Supplementary notes 35 to 39, further comprising:

transmitting and receiving a packet for theoretical value measurement to and from the throughput measuring apparatus.

(Supplementary Note 41)

A throughput measuring program causing a computer to execute:

a data transmitting function of transmitting data to a receiving device;

a feedback receiving function of receiving a feedback indicating a receiving completion of the data, from the receiving device;

a boundary value calculating function of calculating a boundary value of a range of values allowable for a throughput, based on the feedback and a transmitted data amount of the data;

a theoretical value measuring function of measuring a theoretical value of the throughput; and an output function of outputting the boundary value when the theoretical value falls outside the range, and outputting the theoretical value when the theoretical value falls within the range.

(Supplementary Note 42)

The throughput measuring program according to Supplementary note 41, wherein the boundary value includes an upper limit, the boundary value calculating function calculates the upper limit, based on the feedback and the transmitted data amount of the data, and the output function outputs the upper limit when the theoretical value is larger than the upper limit.

(Supplementary Note 43)

The throughput measuring program according to Supplementary note 42, wherein the feedback includes a receiving start time and a receiving completion time when the receiving device receives the data, and the boundary value calculating function calculates the upper limit, based on a lapse of receiving time from the receiving start time until the receiving completion time, and the transmitted data amount.

(Supplementary Note 44)

The throughput measuring program according to Supplementary note 42, wherein the feedback includes a lapse of receiving time from a receiving start time until a receiving completion time when the receiving device receives the data, and the boundary value calculating function calculates the upper limit, based on the lapse of receiving time and the transmitted data amount.

(Supplementary Note 45)

The throughput measuring program according to any one of Supplementary notes 42 to 44, wherein the feedback includes a received data amount when the receiving device receives the data, and the boundary value calculating function calculates the upper limit, based on the received data amount in place of the transmitted data amount.

(Supplementary Note 46)

The throughput measuring program according to any one of Supplementary notes 41 to 45, wherein the boundary value includes a lower limit, the boundary value calculating function calculates the lower limit of the throughput, based on a transmitting start time when transmitting the data is started, a transmitting completion time, and the transmitted data amount, and the output function outputs the lower limit when the theoretical value is smaller than the lower limit.

(Supplementary Note 47)

The throughput measuring program according to Supplementary note 46, wherein the transmitting completion time is a feedback receiving time when the feedback is received.

(Supplementary Note 48)

The throughput measuring program according to Supplementary note 46, wherein the feedback includes a receiving completion time when the receiving device completes receiving the data, and the transmitting completion time is the receiving completion time.

(Supplementary Note 49)

The throughput measuring program according to any one of Supplementary notes 41 to 48, wherein the theoretical value measuring function measures the theoretical value by a round trip time (RTT) and a packet loss rate.

(Supplementary Note 50)

The throughput measuring program according to any one of Supplementary notes 41 to 49, wherein the transmitting function transmits the data by a transmission control protocol (TCP).

(Supplementary Note 51)

The throughput measuring program according to any one of Supplementary notes 41 to 50, wherein the theoretical value measuring function transmits and receives a packet for theoretical value measurement to and from the receiving device.

(Supplementary Note 52)

A receiving program causing a computer to execute:

a data receiving function of receiving data from a throughput measuring apparatus;

a measuring function of detecting a receiving completion of the data; and a feedback transmitting function of transmitting a feedback indicating the receiving completion to the throughput measuring apparatus, after the receiving completion.

(Supplementary Note 53)

The receiving program according to Supplementary note 52, wherein the measuring function measures a receiving completion time of the data, and the feedback includes the receiving completion time.

(Supplementary Note 54)

The receiving program according to Supplementary note 53, wherein the measuring function measures a receiving start time of the data, and the feedback includes the receiving start time.

(Supplementary Note 55)

The receiving program according to Supplementary note 52 or 53, wherein the measuring function measures a receiving start time and a receiving completion time of the data, and calculates a lapse of receiving time, and the feedback includes the lapse of receiving time.

(Supplementary Note 56)

The receiving program according to any one of Supplementary notes 52 to 55, wherein the measuring function measures a received data amount of the data, and the feedback includes the received data amount.

(Supplementary Note 57)

The receiving program according to any one of Supplementary notes 52 to 56, causing the computer to further execute:

a theoretical value packet transmitting/receiving function of transmitting and receiving a packet for theoretical value measurement to and from the throughput measuring apparatus.

(Supplementary Note 58)

A computer readable recording medium recorded with the throughput measuring program according to any one of Supplementary notes 41 to 51.

(Supplementary Note 59)

A computer readable recording medium recorded with the receiving program according to any one of Supplementary notes 52 to 57.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2015-218369, filed on Nov. 6, 2015, the disclosure of which is incorporated herein in its entirety by reference.

REFERENCE SIGNS LIST

10 Throughput measuring apparatus
11 Data transmitting unit
12 Feedback receiving unit
13 Boundary value calculating unit
14 Theoretical value measuring unit
141 Theoretical value packet transmitting/receiving unit
142 Loss rate measuring unit
143 RTT measuring unit
144 Calculating unit
15 Output unit
40, 50 Receiving device
41 Data receiving unit
42 Measuring unit
43 Feedback transmitting unit
54 Theoretical value packet transmitting/receiving unit
70 Information processing device
71 Communication interface
72 Input-output interface
73 Arithmetic device
74 Storage device
75 Non-volatile storage device
76 Drive device
77 Recording medium

What is claimed is:

1. A throughput measuring apparatus comprising:
    a data transmitter configured to transmit data of an application software to a receiving device by transmission control protocol (TCP);
    a feedback receiver configured to receive, at an application layer, a feedback indicating a receiving completion of the data at an application layer of the receiving device, from the receiving device;
    hardware, including memory and a processor, to:
        calculate a boundary value of a range of values allowable for a throughput, based on the feedback and a transmitted data amount of the data;
        measure a theoretical value of the throughput between transport layers; and
        output the boundary value when the theoretical value falls outside the range, and output the theoretical value when the theoretical value falls within the range.

2. The throughput measuring apparatus according to claim 1, wherein
    the boundary value includes an upper limit,
    the hardware calculates the upper limit, based on the feedback and the transmitted data amount of the data, and the hardware outputs the upper limit when the theoretical value is larger than the upper limit.

3. The throughput measuring apparatus according to claim 2, wherein
the feedback includes a receiving start time and a receiving completion time when the receiving device receives the data, and
the hardware calculates the upper limit, based on a lapse of receiving time from the receiving start time until the receiving completion time, and the transmitted data amount.

4. The throughput measuring apparatus according to claim 2, wherein
the feedback includes a lapse of receiving time from a receiving start time until a receiving completion time when the receiving device receives the data, and
the hardware calculates the upper limit, based on the lapse of receiving time and the transmitted data amount.

5. The throughput measuring apparatus according to claim 2, wherein
the feedback includes a received data amount when the receiving device receives the data, and
the hardware calculates the upper limit, based on the received data amount in place of the transmitted data amount.

6. The throughput measuring apparatus according to claim 1, wherein
the boundary value includes a lower limit,
the hardware calculates the lower limit of the throughput, based on a transmitting start time when transmitting the data is started, a transmitting completion time, and the transmitted data amount, and
the hardware outputs the lower limit when the theoretical value is smaller than the lower limit.

7. The throughput measuring apparatus according to claim 6, wherein
the transmitting completion time is a feedback receiving time when the feedback is received.

8. The throughput measuring apparatus according to claim 6, wherein
the feedback includes a receiving completion time when the receiving device completes receiving the data, and
the transmitting completion time is the receiving completion time.

9. The throughput measuring apparatus according to claim 1, wherein
the processor transmits and receives a packet for theoretical value measurement to and from the receiving device.

10. A throughput measuring system comprising:
the throughput measuring apparatus according to claim 1; and
the receiving device comprising:
a data receiver configured to receive the data from the throughput measuring apparatus, the receiving device to detect the receiving completion of the data, and
a feedback transmitter configured to transmit the feedback indicating the receiving completion to the throughput measuring apparatus, after the receiving completion,
wherein
the data transmitter transmits the data to the data receiver, and
the feedback receiver receives the feedback from the feedback transmitter.

11. The throughput measuring apparatus according to claim 1, wherein
the hardware measures the theoretical value by a round trip time (RTT) and a packet loss rate.

12. The throughput measuring apparatus according to claim 1, wherein
the data transmitter transmits the data by a transmission control protocol (TCP).

13. A throughput measuring method comprising:
transmitting data to a receiving device;
receiving a feedback indicating a receiving completion of the data, from the receiving device;
calculating a boundary value of a range of values allowable for a throughput, based on the feedback and a transmitted data amount of the data;
measuring a theoretical value of the throughput; and
outputting the boundary value when the theoretical value falls outside the range, and outputting the theoretical value when the theoretical value falls within the range.

14. The throughput measuring method according to claim 13, wherein
the boundary value includes an upper limit, and
the throughput measuring method comprises calculating the upper limit, based on the feedback and the transmitted data amount of the data, and outputting the upper limit when the theoretical value is larger than the upper limit.

15. The throughput measuring method according to claim 14, wherein
the feedback includes a receiving start time and a receiving completion time when the receiving device receives the data, and
the throughput measuring method comprises calculating the upper limit, based on a lapse of receiving time from the receiving start time until the receiving completion time, and the transmitted data amount.

16. The throughput measuring method according to claim 13, wherein
the boundary value includes a lower limit, and
the throughput measuring method comprises calculating the lower limit of the throughput, based on a transmitting start time when transmitting the data is started, a transmitting completion time, and the transmitted data amount, and outputting the lower limit when the theoretical value is smaller than the lower limit.

17. The throughput measuring method according to claim 16, wherein
the transmitting completion time is a feedback receiving time when the feedback is received.

18. The throughput measuring method according to claim 16, wherein
the feedback includes a receiving completion time when the receiving device completes receiving the data, and
the transmitting completion time is the receiving completion time.

19. The throughput measuring method according to claim 13, further comprising:
transmitting and receiving a packet for theoretical value measurement to and from the receiving device.

20. A non-transitory computer-readable recording medium recorded with a throughput measuring program causing a computer to execute:
a data transmitting function of transmitting data to a receiving device;
a feedback receiving function of receiving a feedback indicating a receiving completion of the data, from the receiving device;

a boundary value calculating function of calculating a boundary value of a range of values allowable for a throughput, based on the feedback and a transmitted data amount of the data;
a theoretical value measuring function of measuring a theoretical value of the throughput; and
an output function of outputting the boundary value when the theoretical value falls outside the range, and outputting the theoretical value when the theoretical value falls within the range.

* * * * *